US007131180B2

(12) United States Patent
Kopras et al.

(10) Patent No.: US 7,131,180 B2
(45) Date of Patent: Nov. 7, 2006

(54) ATTACHMENT FOR POWER TOOL

(75) Inventors: Robert K. Kopras, Black Earth, WI (US); Al Uzumcu, Vernon Hills, IL (US); Scott Adler, Madison, WI (US); Brian Albrecht, Baraboo, WI (US)

(73) Assignee: Credo Technology Corporation, Broadview, IL (US)

( * ) Notice: Subject to any disclaimer, the term of this patent is extended or adjusted under 35 U.S.C. 154(b) by 261 days.

(21) Appl. No.: 10/753,094

(22) Filed: Jan. 7, 2004
(Under 37 CFR 1.47)

(65) Prior Publication Data

US 2005/0081364 A1 Apr. 21, 2005

Related U.S. Application Data

(60) Provisional application No. 60/438,794, filed on Jan. 8, 2003, provisional application No. 60/449,178, filed on Feb. 21, 2003.

(51) Int. Cl.
*B23P 23/00* (2006.01)
*B23C 1/20* (2006.01)

(52) U.S. Cl. ........................ 29/560; 409/182; 409/180; 409/210; 409/137; 16/111.1; 16/426; 144/136.95

(58) Field of Classification Search ........ 409/175–182, 409/137, 210, 218, 206, 214, 204; 144/136.95, 144/154.5; 408/241 S; 16/111.1, 422, 426, 16/429, 110.1; 29/560
See application file for complete search history.

(56) References Cited

U.S. PATENT DOCUMENTS

| | | | |
|---|---|---|---|
| 1,423,511 | A | 7/1922 | Baker |
| 1,581,719 | A | 4/1926 | Carter |
| 2,193,878 | A | 3/1940 | Martin |
| 2,263,136 | A | 11/1941 | Knouse et al. |
| 2,310,166 | A | 2/1943 | Way |
| 2,517,882 | A | 8/1950 | Johnson |
| 2,525,588 | A | 10/1950 | Cameron et al. |
| 2,736,792 | A | 2/1956 | Freeland |
| 2,822,615 | A | 2/1958 | Durst et al. |
| 2,842,173 | A | 7/1958 | Turner et al. |
| 2,852,051 | A | 9/1958 | Bickner |
| 2,855,679 | A | 10/1958 | Gibble |
| 3,117,480 | A | 1/1964 | Peddinghaus |
| 3,767,876 | A | 10/1973 | Batson |
| 3,919,541 | A | 11/1975 | Chao |
| 3,919,573 | A | 11/1975 | Schmuck |
| 3,977,278 | A | 8/1976 | Jackson |
| 4,050,003 | A | 9/1977 | Owings et al. |
| 4,078,869 | A | 3/1978 | Honeycutt |

(Continued)

FOREIGN PATENT DOCUMENTS

| | | |
|---|---|---|
| DE | 1427027 | 11/1968 |

(Continued)

OTHER PUBLICATIONS

Printout from www.dremel.com, product description of #677 Dremelite, 1 page, copyright 2000.

(Continued)

*Primary Examiner*—Erica Cadugan
(74) *Attorney, Agent, or Firm*—Foley & Lardner LLP

(57) ABSTRACT

An attachment for a hand-held power tool, such as a rotary cutting tool, is disclosed. The attachment is configured for selective coupling to a rotary cutting tool and includes a handle that is substantially perpendicular to a central longitudinal axis of the rotary cutting tool when the attachment is coupled to the rotary cutting tool.

25 Claims, 24 Drawing Sheets

U.S. PATENT DOCUMENTS

| | | | | |
|---|---|---|---|---|
| 4,283,757 | A | 8/1981 | Nalbandian et al. | |
| 4,306,264 | A | 12/1981 | Alessio | |
| 4,381,037 | A | 4/1983 | Cuneo | |
| 4,513,381 | A | 4/1985 | Houser, Jr. et al. | |
| 4,545,121 | A | 10/1985 | Armbruster et al. | |
| 4,561,845 | A | 12/1985 | Meller | |
| 4,572,715 | A * | 2/1986 | Wolff | 409/180 |
| 4,652,191 | A * | 3/1987 | Bernier | 409/182 |
| 4,653,356 | A | 3/1987 | Golden | |
| 4,689,534 | A | 8/1987 | Gerber et al. | |
| 4,796,682 | A | 1/1989 | Michaels | |
| 4,808,862 | A | 2/1989 | Carvalho et al. | |
| 4,820,090 | A | 4/1989 | Chen | |
| 4,833,782 | A | 5/1989 | Smith | |
| 4,856,195 | A | 8/1989 | Grossmann et al. | |
| 4,932,294 | A | 6/1990 | Chang | |
| 4,938,642 | A | 7/1990 | Imahashi et al. | |
| 5,029,706 | A | 7/1991 | McCracken | |
| 5,033,552 | A * | 7/1991 | Hu | 173/217 |
| 5,062,460 | A | 11/1991 | DeLine | |
| 5,074,081 | A | 12/1991 | Beth et al. | |
| 5,099,160 | A | 3/1992 | Strözel et al. | |
| 5,139,065 | A | 8/1992 | Stark | |
| 5,158,354 | A | 10/1992 | Simonin | |
| 5,169,225 | A | 12/1992 | Palm | |
| 5,238,336 | A | 8/1993 | Sanders et al. | |
| 5,257,654 | A | 11/1993 | Bean et al. | |
| 5,265,657 | A | 11/1993 | Matsumoto et al. | |
| 5,267,129 | A | 11/1993 | Anderson | |
| 5,293,915 | A * | 3/1994 | Fuchs et al. | 144/154.5 |
| 5,323,823 | A | 6/1994 | Kopras | |
| 5,412,546 | A | 5/1995 | Huang | |
| 5,445,479 | A | 8/1995 | Hillinger | |
| 5,466,183 | A | 11/1995 | Kirn et al. | |
| 5,473,519 | A | 12/1995 | McCallops et al. | |
| 5,530,301 | A | 6/1996 | Fu et al. | |
| 5,553,675 | A | 9/1996 | Pitzen et al. | |
| 5,558,570 | A | 9/1996 | Nakamura et al. | |
| 5,694,992 | A | 12/1997 | Kikuchi | |
| 5,793,130 | A | 8/1998 | Anderson | |
| 5,797,670 | A | 8/1998 | Snoke et al. | |
| 5,813,805 | A | 9/1998 | Kopras | |
| 5,902,080 | A | 5/1999 | Kopras | |
| 5,974,674 | A | 11/1999 | Kelly | |
| 5,982,059 | A | 11/1999 | Anderson | |
| 6,067,714 | A | 5/2000 | Taylor et al. | |
| 6,206,538 | B1 | 3/2001 | Lemoine | |
| 6,263,980 | B1 * | 7/2001 | Wadge | 173/217 |
| 6,318,874 | B1 | 11/2001 | Matsunaga | |
| 6,328,505 | B1 | 12/2001 | Gibble | |
| 6,443,675 | B1 | 9/2002 | Kopras et al. | |
| 6,443,676 | B1 | 9/2002 | Kopras | |
| 6,494,590 | B1 | 12/2002 | Paganini et al. | |
| 6,533,432 | B1 | 3/2003 | Alender | |
| 6,565,227 | B1 | 5/2003 | Davis | |
| 6,575,590 | B1 | 6/2003 | Wadsworth | |
| 6,754,935 | B1 * | 6/2004 | Pozgay et al. | 16/422 |
| 6,755,597 | B1 * | 6/2004 | Bergner et al. | 409/178 |
| 6,854,938 | B1 | 2/2005 | Kopras et al. | |
| 2002/0048166 | A1 | 4/2002 | Matsunaga | |
| 2002/0105794 | A1 | 8/2002 | Hanscom et al. | |
| 2002/0131834 | A1 | 9/2002 | Lui et al. | |
| 2002/0172035 | A1 | 11/2002 | Hara et al. | |
| 2003/0042803 | A1 | 3/2003 | Hirschburger et al. | |
| 2003/0095402 | A1 | 5/2003 | Lin | |
| 2003/0147709 | A1 | 8/2003 | Hara et al. | |

FOREIGN PATENT DOCUMENTS

| | | |
|---|---|---|
| DE | 2529668 | 1/1977 |
| DE | 85 11 533 U1 | 8/1986 |
| DE | 3831344 | 3/1990 |
| DE | 4326652 | 1/1994 |
| DE | 4422247 | 1/1996 |
| DE | 4435573 | 4/1996 |
| DE | 19503526 | 8/1996 |
| DE | 19532298 | 6/1997 |
| DE | 19628946 | 1/1998 |
| DE | 19646863 | 5/1998 |
| DE | 29807070 | 7/1998 |
| EP | 878273 | 11/1998 |
| EP | 1068934 | 1/2001 |
| EP | 1072842 | 1/2001 |
| FR | 2523891 | 9/1983 |
| GB | 2305719 | 4/1997 |
| JP | 5656313 | 5/1981 |
| JP | 6-246645 | 9/1994 |
| WO | WO 9902310 | 1/1999 |
| WO | WO-02/04182 A1 * | 1/2002 |

OTHER PUBLICATIONS

Printout from www.dremel.com, product description of #9000-04 Advantage Rotary Saw™ Kit, 2 pages, copyright 2000.
MSC Catalog, 1995-96 edition, p. 1525.
Partial European Search Report, 3 pgs.; European Patent No. EP 01 10 0218; date of completion of search Dec. 13, 2001.
Merlaku K., "Method for illuminating work area of electric drill", Mar. 20, 2003, Abstract and Figure for DE 20215382 U1.
Ryobi Limited Annual Report, 2002.
Printout from www.makitaope.com, "eLuminate Series Provides More Light & Accurate Work", 1 page, press release date Aug. 11, 2002.
Printout from www.Makitaope.com, "1235F-12V (3.0Ah) Ni-MH Battery with LED Light", 1 page, printed Jul. 1, 2003.
Printout from www.makitaope.com, "New eLuminate™ Series Highlights 12V Battery with LED", press release date Aug. 11, 2002, 2 pages.
European Search Report; Application No. EP 04 00 0246; mailed May 17, 2004.
European Search Report for Application No. EP 04 00 0246, date of mailing Apr. 26, 2004, 3 pages.
European Office Action for Application No. EP 04 00 0246, date of mailing Nov. 28, 2005, 5 pages.

* cited by examiner

ATTACHMENT FOR POWER TOOL

CROSS-REFERENCE TO RELATED PATENT APPLICATIONS

The present application claims the benefit of U.S. Provisional Patent Application No. 60/438,794 ("ATTACHMENT FOR POWER TOOL") filed Jan. 8, 2003 and U.S. Provisional Patent Application No. 60/449,178 ("ATTACHMENT FOR POWER TOOL") filed Feb. 21, 2003 under 35 U.S.C. § 119, incorporated in the present application by reference.

FIELD OF THE INVENTION

The present invention relates generally to the field of attachments for power tools. More specifically, the present invention relates to a handle attachment for use with hand-held power tools such as rotary cutout or cutting tools.

BACKGROUND OF THE INVENTION

A rotary cutout or cutting tool is a hand-held power tool having an electric motor adapted to rotate a cutting tool bit at high speeds. The cutting tool bit includes a cutting portion positioned along the side walls of the cutting tool bit (e.g. the cutting tool bit may include a sharp cutting edge that is wrapped in a spiral around the axis of the bit). Rotary cutting tools include an electric motor disposed in a generally cylindrical housing, and a rotary cutting tool bit extending from a lower portion of the housing along the axis of the housing. The rotary cutting tool is designed for cutting a workpiece (e.g. a sheet of plywood or drywall) in a direction perpendicular to the axis of the cutting tool bit.

Conventionally, rotary cutting tools are operated by grasping the housing of the tool with one or more hands, turning on the electric motor to begin the rotation of the cutting tool bit, moving the cutting tool bit into the workpiece, and then moving the cutting tool bit through the workpiece in a direction perpendicular to the longitudinal axis of the cutting tool bit by moving the housing in a direction parallel to the plane of the workpiece. Control of a cut being made by the rotary cutting tool is dependant on the ability of the operator to properly position in the tool in relation to the workpiece by firmly grasping the housing of the tool. During operation of the rotary cutting tool, a variety of factors may prevent an operator from achieving precise control (e.g. vibrations caused by irregularities in the workpiece, operator fatigue from grasping the housing, inability of operator to grasp the housing due to increased heat from the motor, etc,).

Attachments for rotary cutting tools are generally known and include detachable handles intended to provide an operator with improved control of tool. Known detachable handle attachments for rotary cutout or cutting tools typically have mounting configurations designed to mount the attachment to a rotary cutout or cutting tool of a specific manufacturer or a specific model. Further, the configuration of known detachable handle attachments may not enable an operator to achieve a desired amount of control over the tool. Typically, such attachments include a handle portion that is rigidly fixed in a position substantially parallel to the rotary cutout or cutting tool.

Accordingly, it would be advantageous to provide an attachment for a rotary cutting tool which may enable convertibility of the rotary cutting tool from a tool having no handle to a tool having a handle that enhances the ability of an operator to control the tool. It would further be advantageous to provide an attachment capable of coupling to rotary cutting tools having a variety of different configurations (e.g., different shapes, designs, sizes, etc.). It would further be advantageous to provide an attachment having a handle that is substantially perpendicular to the longitudinal axis of a rotary cutting tool to which the attachment is attached (i.e., a jigsaw-type configuration). It would also be advantageous to provide an attachment which may enable convertibility of a rotary cutting tool from a tool having a handle with a gripping surface substantially parallel to an axis of the tool body to a tool having a handle with a gripping surface substantially perpendicular to the axis of the tool body. It would further be advantageous to provide an attachment that includes a base that may be adjusted with respect to a body of the attachment between an extended position and a retracted position. It would also be advantageous to provide an attachment that may include one or more storage locations provided within the attachment (e.g., for storing items such as wrenches, tool bits, etc.)

Accordingly, it would be advantageous to provide an attachment having these or other advantageous features.

SUMMARY OF THE INVENTION

The present invention relates to an attachment for selective coupling to a rotary cutting tool. The attachment comprises a handle that is substantially perpendicular to a central longitudinal axis of the rotary cutting tool when the attachment is coupled to the rotary cutting tool.

In an alternative embodiment, the attachment comprises a body having a member adapted to couple the attachment to the rotary cutting tool and the handle is integrally formed with the body.

In another embodiment, the attachment further comprises a base that is selectively adjustable between an extended position and a retracted position relative to the body of the attachment. Preferably, a shaft extends between the base and the body of the attachment whereby the shaft is configured for sliding movement within a portion of the body. This shaft can have any number of different cross-sectional shapes such as a triangle, a pentagon, a hexagon, a diamond, a rhombus, a octagon, or the preferred shape, namely a trapezoid.

In alterative embodiments, an edge guide is configured for selective coupling to the base or a cut-out guide is coupled to the base. In still yet another embodiment, a dust collection device can be configured for selective coupling to the base. In still yet another embodiment, a storage compartment can be provided in the attachment for storage of tools or tool bits.

The present invention further relates to a rotary cutting tool system having a rotary cutting tool having a housing and a central longitudinal axis. The system further includes a first attachment adapted to be selectively coupled to the housing. The first attachment includes a handle portion having a gripping surface provided substantially perpendicular to the central longitudinal axis when the attachment is coupled to the housing of the rotary cutting tool. The rotary cutting tool may be operated in a first mode of operation when the first attachment is coupled to the housing and a second mode of operation wherein the first attachment is removed from the rotary cutting tool.

In another embodiment, the rotary cutting tool system further includes a second attachment adapted to be selectively coupled to the housing. The second attachment includes a handle with a griping surface which is substantially parallel to the central longitudinal axis of the tool when the second attachment is coupled to the housing of the rotary cutting tool.

The present invention further relates to a rotary cutting tool adapted for operation in one of at least two different modes of operation. The rotary cutting tool comprises a tool housing adapted to support a tool bit having a longitudinal axis and a first attachment adapted to be selectively coupled to the housing. The first attachment includes a handle portion having a gripping surface provided substantially perpendicular to the longitudinal axis of a tool bit when the first attachment is coupled to the housing of the rotary cutting tool. A first of the at least two different modes of operation resulting when the first attachment is coupled to the housing so that a user may grasp the handle portion of the first attachment and a second of the at least two different modes of operation resulting when the first attachment is removed from the housing so that a user may grasp the tool housing.

DETAILED DESCRIPTION OF THE PREFERRED EMBODIMENTS

With reference to FIGS. 1–24, an attachment for a rotary cutting tool, such as but not limited to a rotary cutting or cutout tool, is shown. Nonexclusive examples of rotary cutting tools are shown and described in U.S. Pat. Nos. 6,443,676, 6,048,260; 5,902,080; D439,484; and D439,122 and U.S. Pat. No. 6,443,675, each of which are expressly incorporated herein by reference and which are assigned to Robert Bosch Tool Corporation, which is also the assignee of the present inventions and application. It should be noted that while the rotary cutout tools shown and described herein and in the patents and applications incorporated by reference are manufactured and sold by Robert Bosch Tool Corporation, tools of other makes and models may also be used in conjunction with the inventions described herein.

Figure 1:
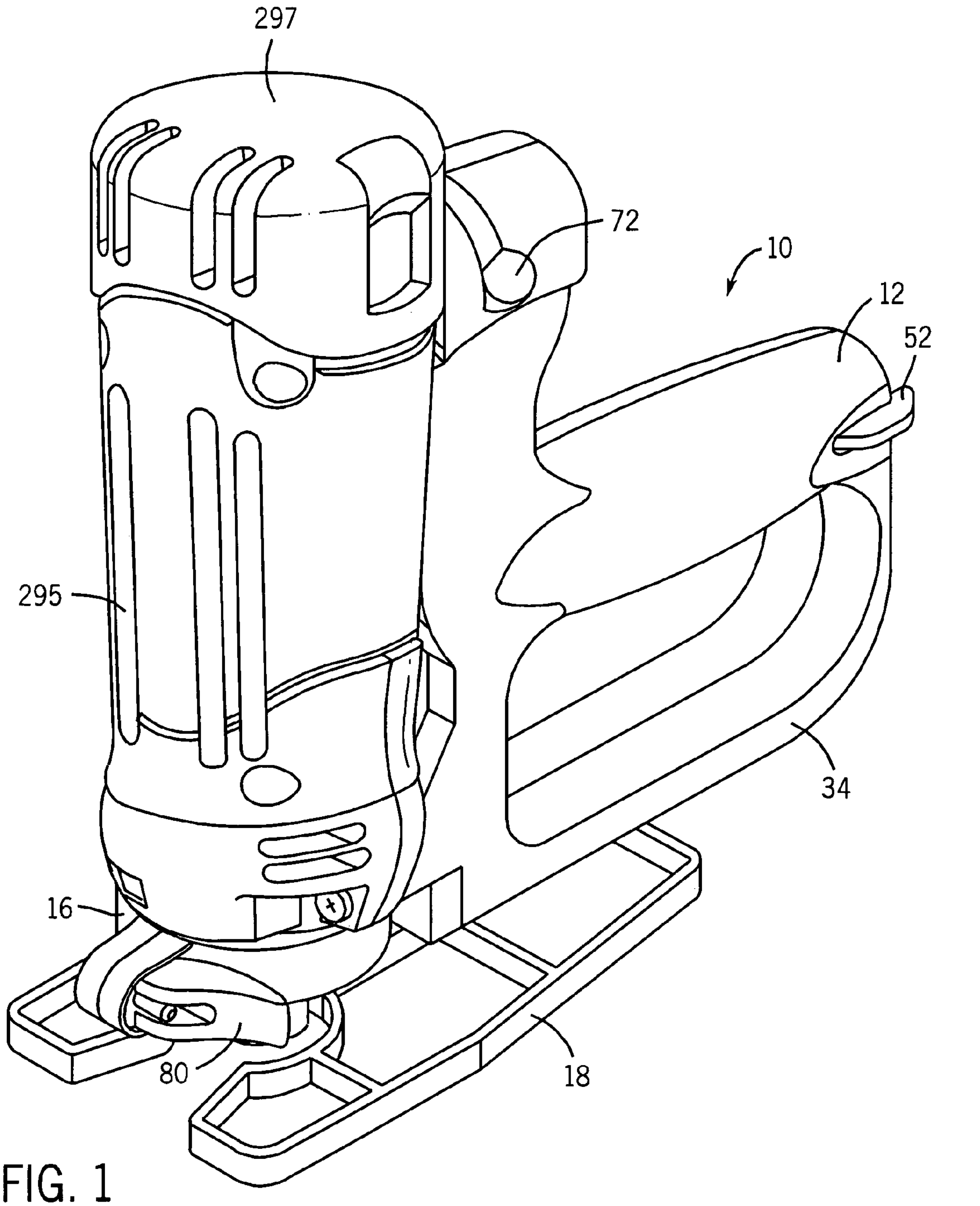
FIG. 1 is a top front perspective view of an attachment according to a preferred embodiment of the present invention coupled to a first rotary cutting tool.

An attachment 10 in accordance with the present invention is shown coupled to a rotary cutting tool in FIG. 1. A rotary cutting tool is a hand-held power tool having an electric motor that rotates a cutting tool bit at high speeds, typically in excess of 10,000 rpm with no load. One key difference between rotary cutting tools and other power tools such as drills is the speed of rotation of the cutting bit. An exemplary electric motor that may be employed in a rotary cutting tool is a conventional 4 amp 115–120V AC electric motor with a no-load rotation speed of 30,000 rpm. Other electric motors, such as one speed, two speed or variable speed motors, may also be employed with amperage in the range of 3 to 5 amps and with no load rotational speeds of 15,000, 20,000, 25,000, 35,000 rpms or higher can be used. The electric motor that drives the cutting tool bit is enclosed in a housing and positioned along the same longitudinal axis as the cutting tool bit (shown as an axis A—A in FIGS. 8 and 9). The cutting tool bit is designed for cutting perpendicularly to the longitudinal axis of the electric motor and the cutting tool bit. During operation, the longitudinal axis of the electric motor and the cutting tool bit is kept generally perpendicular to the surface or the plane of a workpiece.

As more clearly shown in FIGS. 2 through 7, the attachment 10 includes a handle portion 12 and devices or mechanisms 14, 16 for coupling or securing the attachment 10 to a rotary cutting tool (e.g., a hand-held rotary cutting or cutout tool, etc.). In the preferred embodiment, the attachment 10 also includes a base 18 coupled to a body 11 of the attachment 10 by a shaft 20.

The handle 12 includes a first surface 30 and a second surface 32. The handle portion 12 is configured such that the palm of an operator is positioned adjacent to the second surface 32 and the fingers of the operator are positioned adjacent to the first surface 30. The first surface 30 and a bottom portion 34 of the attachment 10 define an aperture or hole 36 through which the fingers of an operator may be inserted. Accordingly, the first surface 30 and the second surface 32 cooperate to form a handle which may be gripped by a user of the attachment.

The handle 12 is configured to be used in a manner similar to a "jigsaw" style handle. In this manner, the handle portion 12 is arranged such that at least one of the first surface 30 and the second surface 32 are arranged substantially perpendicular to the longitudinal axis (A—A of FIGS. 8 and 9) of a rotary cutting tool to which the attachment 10 is coupled. Thus, the handle 12 may be described as extending generally perpendicular to the longitudinal axis of a rotary cutting tool when coupled to the rotary cutting tool, in a manner similar to a "jigsaw" style handle. Such an arrangement is shown in the FIGURES and will be described in greater detail below. In this manner, a jigsaw style handle may be provided for a rotary cutting tool that is adapted or configured to form cuts in a workpiece in a lateral direction (e.g., by moving a tool bit coupled to a tool across a surface of a workpiece, cuts may be formed through the workpiece as the tool bit is moved along the surface). Providing a jigsaw style handle as described herein is intended to enable a user to form cuts in a workpiece with greater control than if such a handle was not provided for the cutout tool. Additionally advantageous features associated with providing a jigsaw handle for a rotary cutout tool are described above and throughout this application.

It should be understood that the term "substantially perpendicular" as used throughout this specification means "more perpendicular than not." Therefore, the angle of the handle (and surfaces 30 and 32) with respect to the axis of a rotary cutting tool coupled to the attachment 10 may be varied from exactly perpendicular by several degrees without departing from the invention.

Figure 3A:
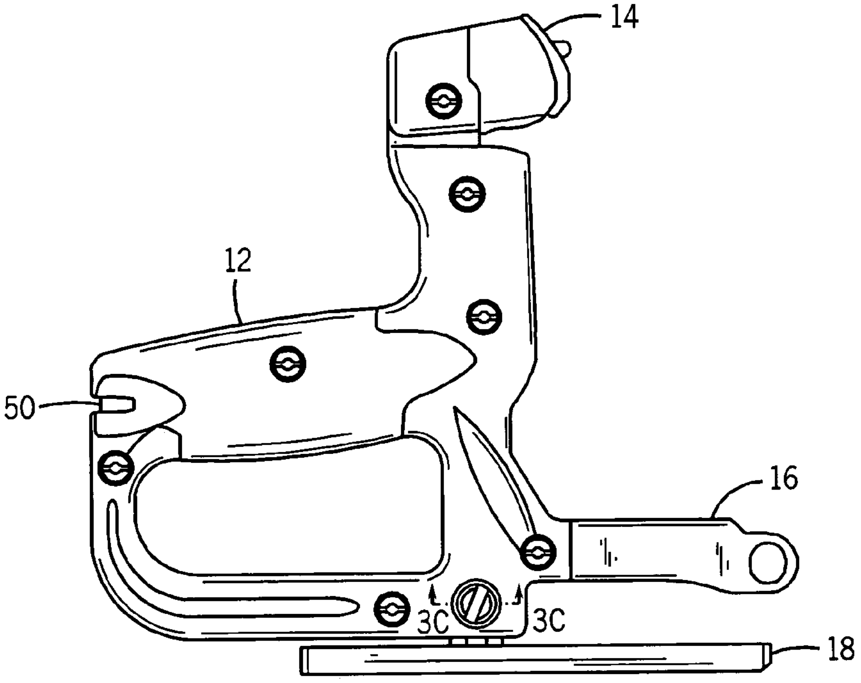
FIG. 3A is a side elevational view of the attachment shown in FIG. 2 showing the base of the attachment in a retracted position.
Figure 3B:
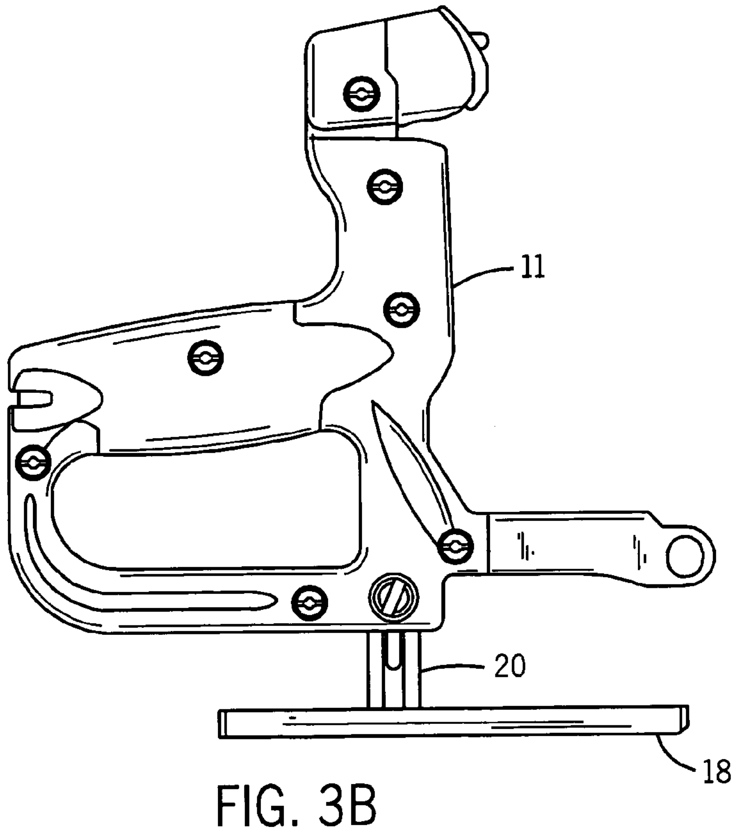
FIG. 3B is a side elevational view of the attachment shown in FIG. 2 showing the base of the attachment in an extended position.

The shaft 20 that couples the base 18 to the body 11 of the attachment 10 is received within the body 11 and is configured for sliding movement between an extended and a retracted position relative to the body 11 and all points in between the extended and retracted positions. This adjustment between an extended and retracted position is most clearly shown in FIGS. 3A and 3B. FIG. 3A illustrates the base 18 in a retracted position, while FIG. 3B shows the base 18 in an extended position.

Figure 3C:
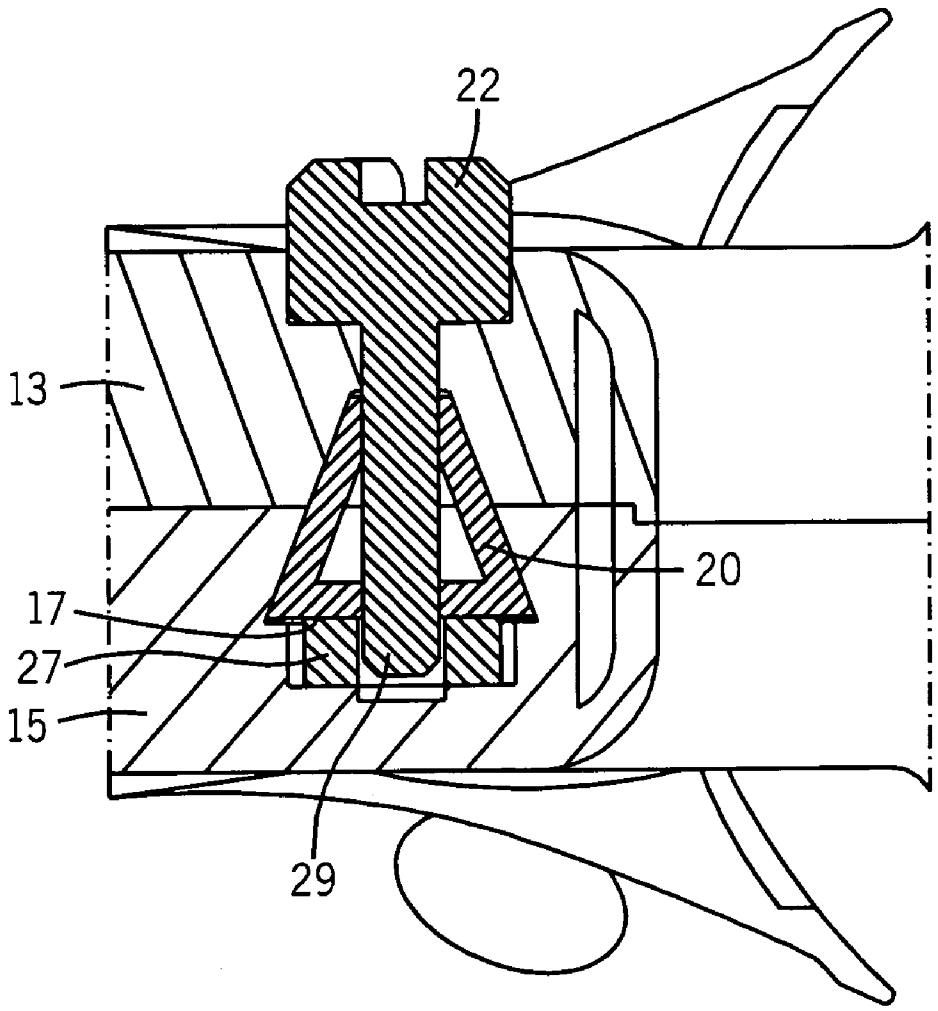
FIG. 3C is a cross-sectional view of the attachment along line 3C—3C of FIGS. 3A.
Figure 4:
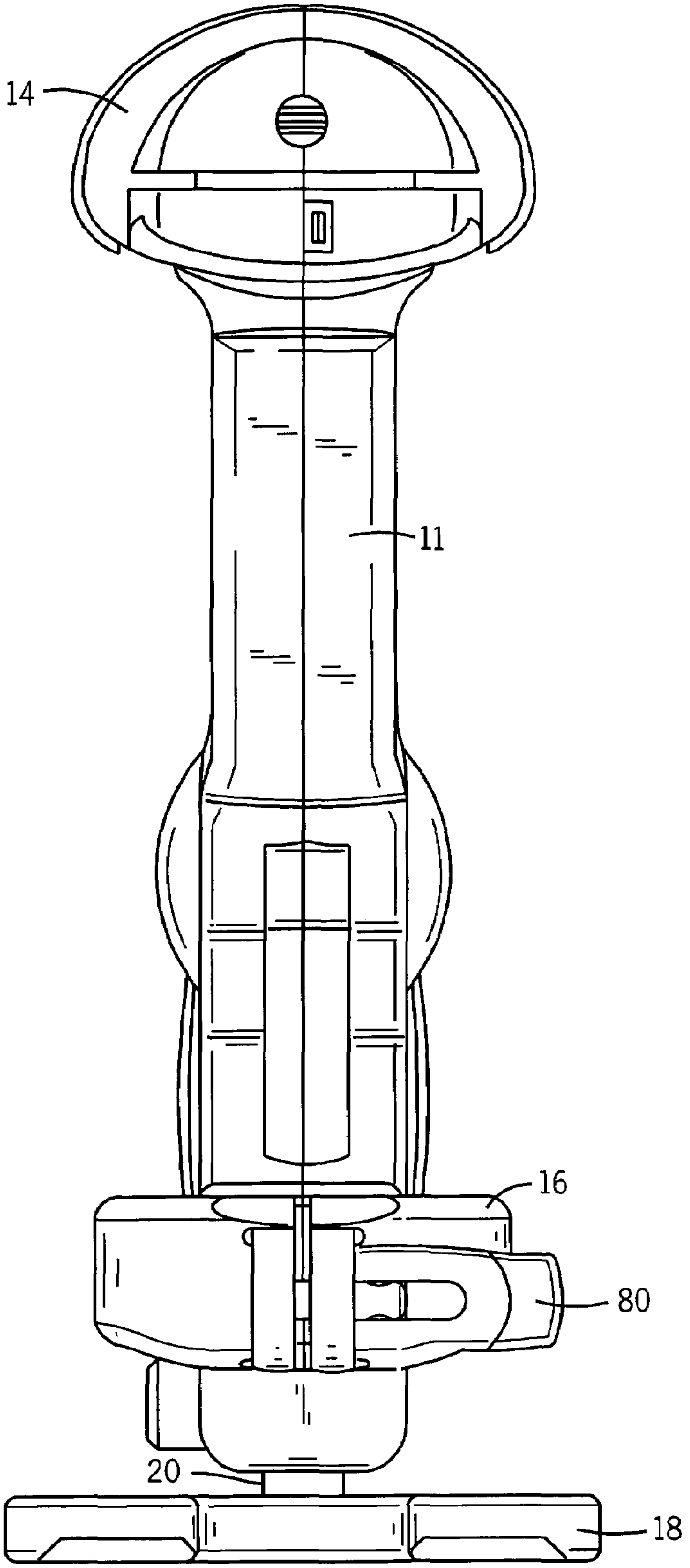
FIG. 4 is a front elevational view of the attachment shown in FIG. 2.
Figure 5:
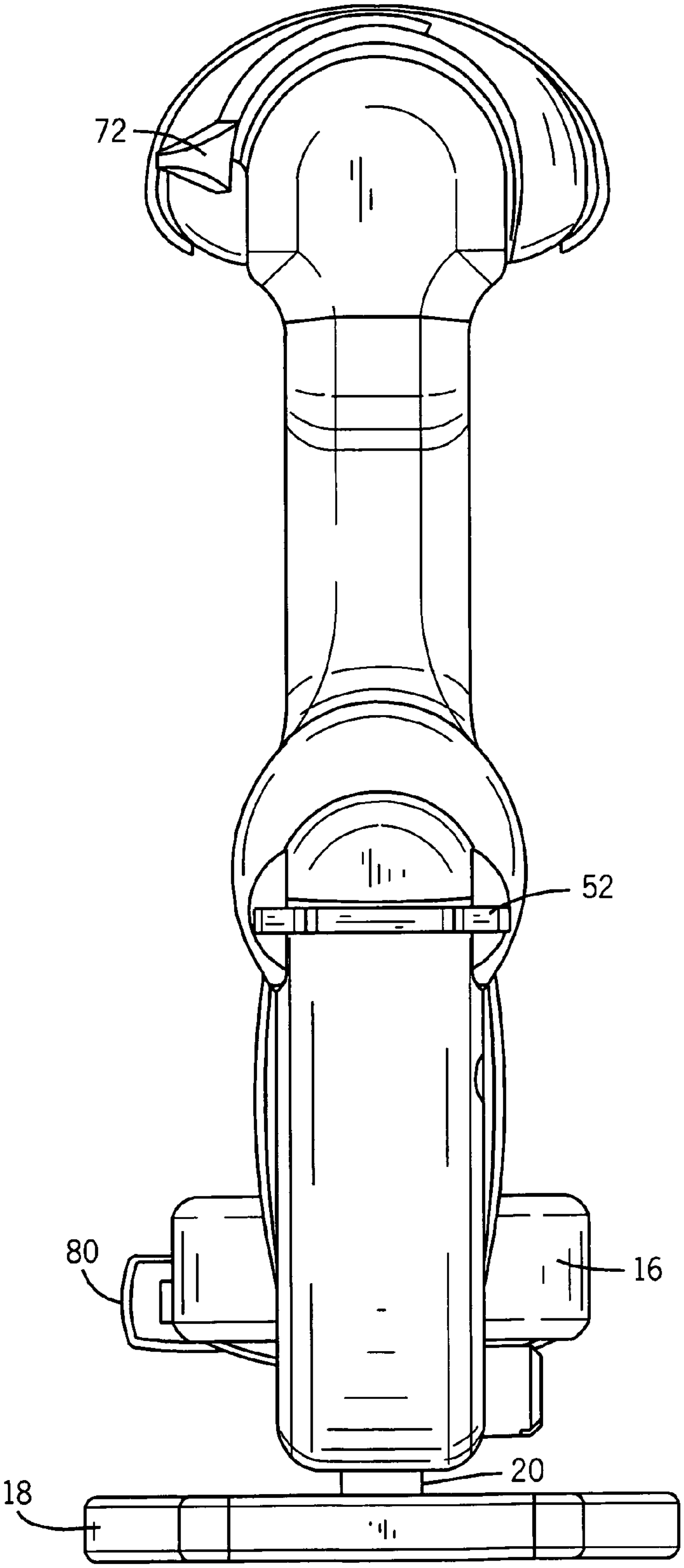
FIG. 5 is a rear elevational view of the attachment shown in FIG. 2.
Figure 6:
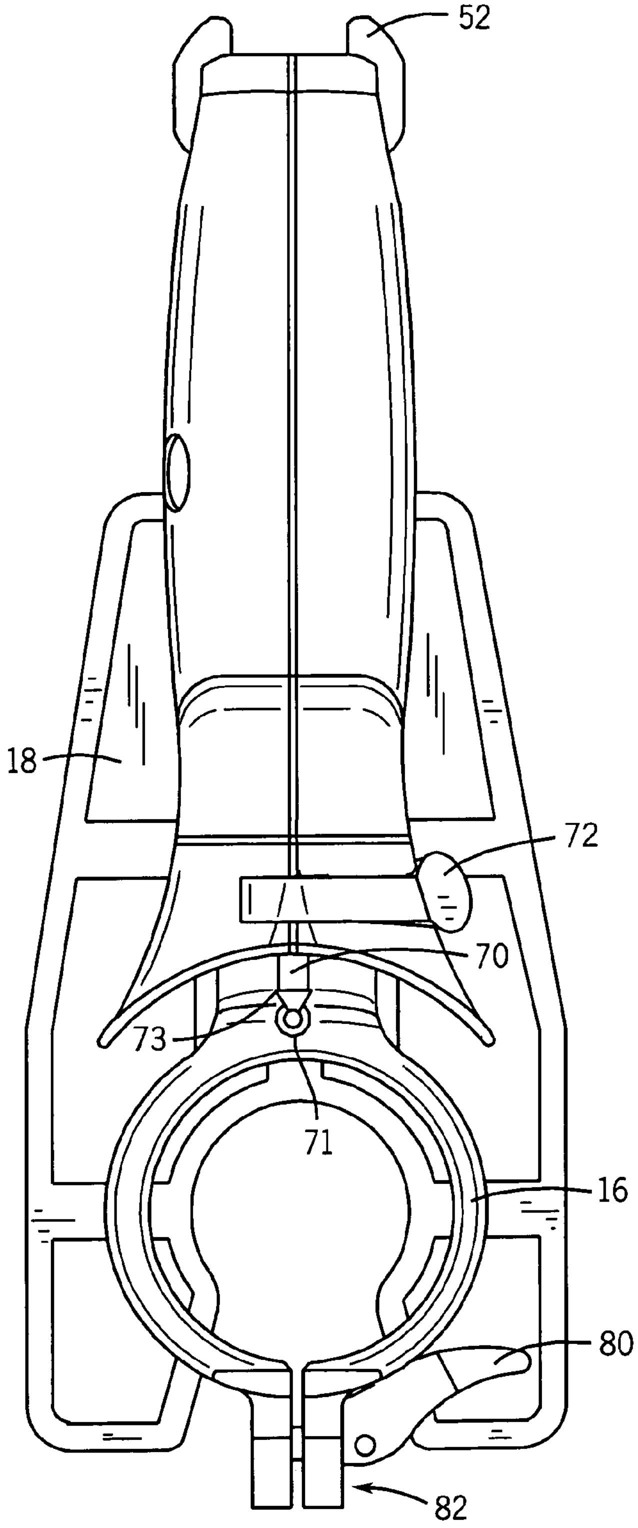
FIG. 6 is a top elevational view of the attachment shown in FIG. 2.
Figure 7:
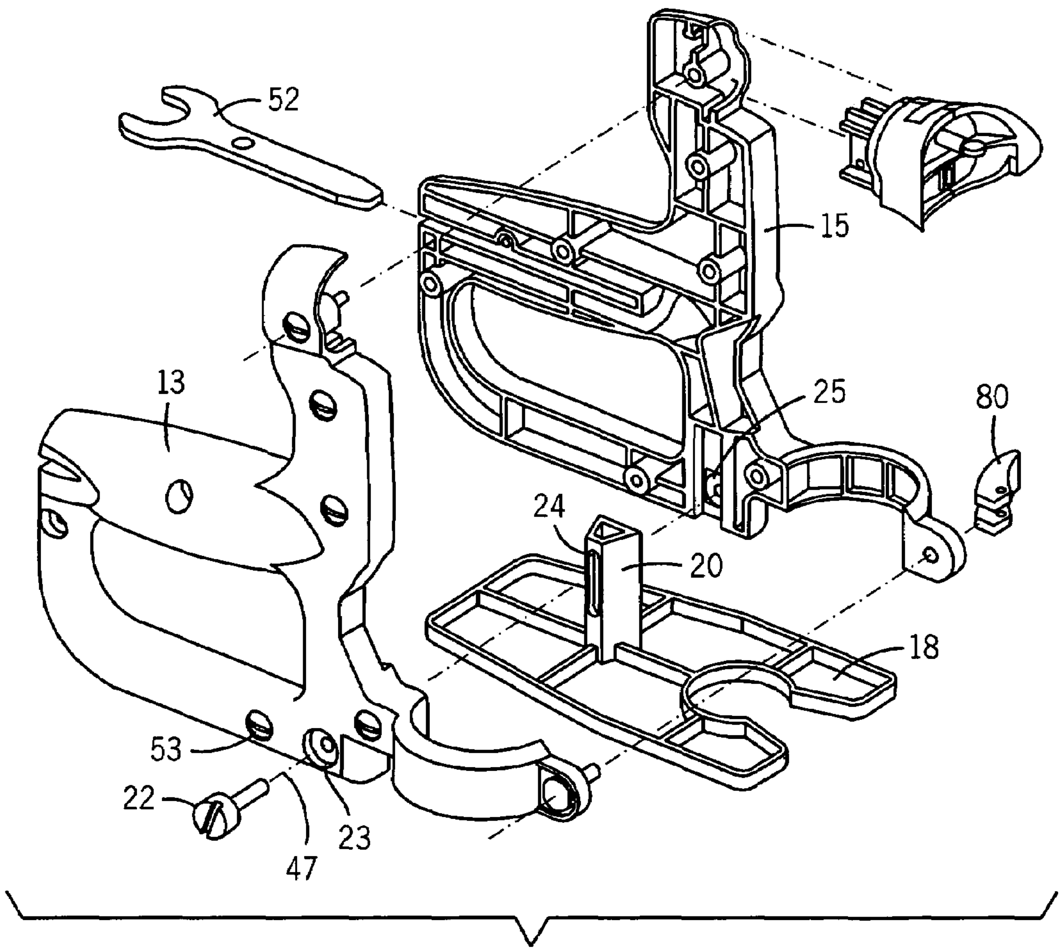
FIG. 7 is an exploded perspective view of the attachment shown in FIG. 2.

As most clearly shown in FIG. 7, the attachment 10 is preferably formed in a clam-shell configuration from a first portion 13 and a second portion 15 held together by a plurality of conventional fasteners such as screws 53. A connector 22 such as a thumbscrew is received in a slot or opening 24 provided in the shaft 20. The connector 22 is inserted through an aperture 23 formed in a first section 13 of the attachment 10, through the slot 24 formed in shaft 20, and finally through an aperture or hole 25 formed in a second section 15 of the attachment 10. One or both of the apertures 23, 25 may include a nut configured to receive therein an extended portion of the connector 22. For example, FIG. 3C illustrates a nut 27 mounted in the second section 15 and configured to receive a distal end 29 of the connector 22. According to a preferred embodiment, the connector 22 may be tightened and loosened without the use of any tools (e.g., screwdriver, wrench, etc.). According to an alternative embodiment, the connector 22 may be configured to provide coupling with the slot 24 using any of a variety of tools.

Tightening the connector 22 (e.g., by rotating the connector 22 in a clockwise direction with respect to its axis) acts to draw a nut 27 toward the first body section 13 and the shaft 20, thus securing the two body sections 13, 15 in fixed relation relative to the base 18 (e.g., shaft 20 is frictionally secured to the body 11). For example, a surface 17 of nut 27 is forced against a surface 25 of the shaft 20 as the connector 22 is tightened. In this manner, the first body section 13 and the nut 27 clamp around the shaft 20 to secure the body 11 in a fixed relationship to the base 18.

The slot 24 formed in the shaft 20 has a generally elongated configuration to allow movement of the base 18 with respect to the body 11 between an extended and retracted position. To adjust the base 18 with respect to the body 11, the connector 22 is loosened (e.g., by rotating the connector 22 counter-clockwise about its axis). Loosening the connector 22 acts to loosen the frictional grip of the first body section 13 and nut 27 on the shaft 20. The base 18 may then be moved by sliding the base 18 and the shaft 20 with respect to the connector 22 and body 11. The connector 22 is configured to be inserted through slot 24 without engaging slot 24 so as to allow relatively uninhibited movement of the connector 22 in the slot 24 as the base 18 is moved toward and away from the body 11.

The shaft 20 has a size and shape that is configured to resist the various forces provided by a rotary cutting tool coupled to attachment 10 (e.g., rotational or torsional forces). For example, as shown in FIG. 7, the shaft 20 has a generally trapezoidal cross-sectional shape. The trapezoidal shape of the shaft 20 provides relatively good resistance to twisting or rotation of the body 11 with respect to the base 18 when a rotary cutting tool coupled to the attachment 10 is being used. A rotary cutting tool may introduce rotational forces as a result of the rotation of the tool bit coupled to the tool, and tightening the connector 22 acts to securely fasten the body 11 to the trapezoidal shaft 20, which in turn provides relatively good resistance to twisting or rotation. While the preferred embodiment shown in the FIGURES shows a shaft having a substantially trapezoidal cross-sectional shape, other shapes that provide relatively good resistance to twisting and rotation may also be utilized. According to alternative embodiments, the shaft may have any cross-sectional shape that contains a surface or line that is not parallel and/or perpendicular to the clamping direction (i.e., the direction along which connector 22 is clamped to nut 27, indicated by line 47 in FIG. 7). For example the shaft may have a cross-sectional shape of a triangle, a pentagon, a hexagon, a diamond, a rhombus, an octagon, an oval, a circle, an ellipse, or any of a number of other shapes.

Figure 2:
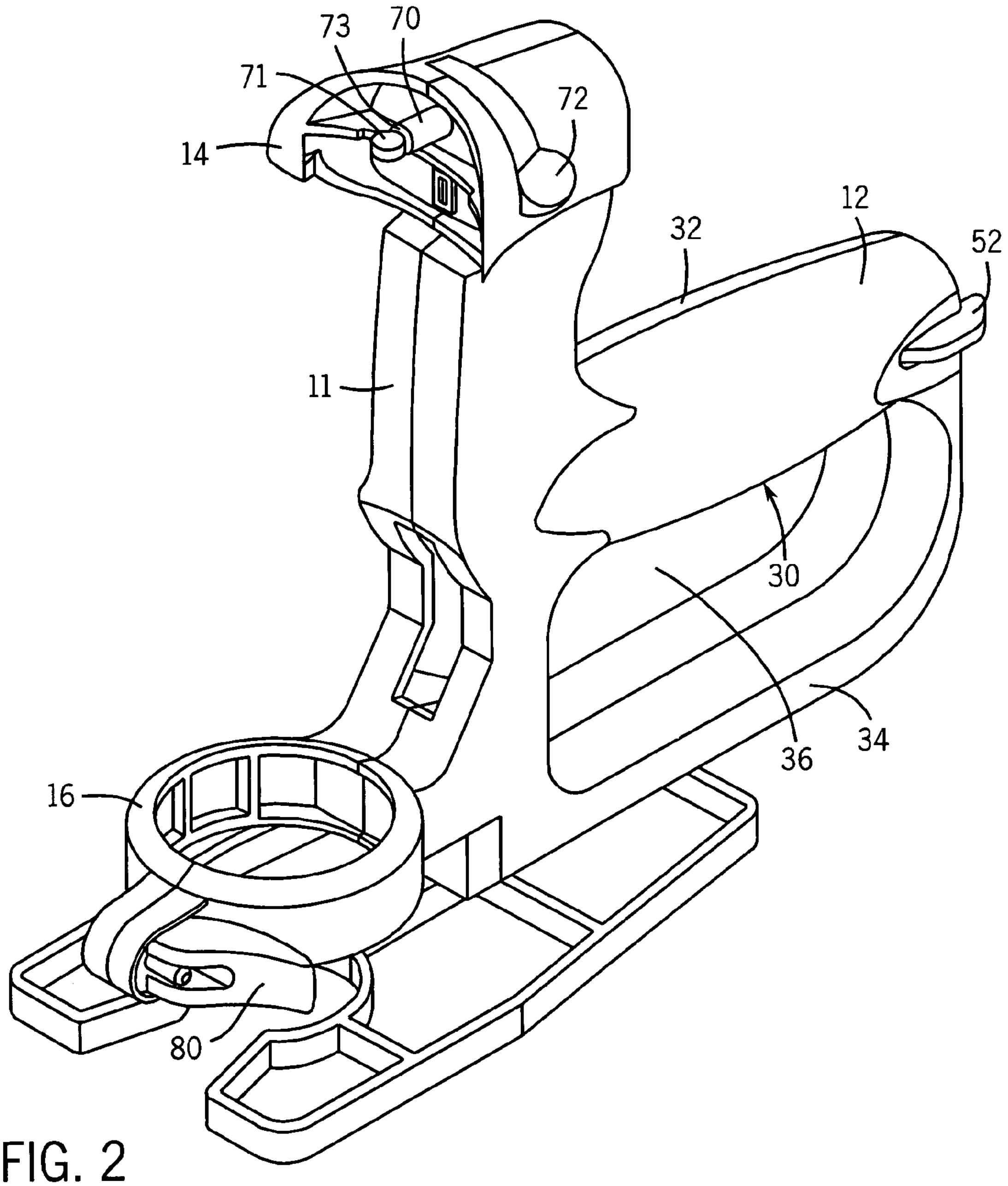
FIG. 2 is perspective view similar to that of FIG. 1 of an attachment according to a preferred embodiment of the present invention shown without a rotary cutting tool.

A preferred structure for detachably or removably coupling the attachment 10 to a rotary cutting tool is described in detail with reference to FIGS. 1 through 9. The attachment 10 may be relatively quickly and easily coupled to or released from the rotary cutting tool. As shown in FIG. 2, a rotatable member or element 70 (e.g., a rod) extends from a portion of the attachment 10. The rotatable member 70 may be inserted into an aperture formed in the housing of a rotary cutting tool (shown in FIG. 8), and preferably includes a body portion or shaft 73 and a radially extending and flattened portion 71 formed at a distal end thereof.

The rotatable member 70 is attached to a lever mechanism 72, at least a portion of which may extend outside of the attachment 10. The lever mechanism 72 may be operated relatively easily by, for example, an operator's thumb. In this manner the lever mechanism 72 and the rotatable member 70 coupled thereto may be rotated about the axis of the rotatable member 70 to couple or decouple the attachment 10 to the housing of a rotary cutting tool. When the lever mechanism 72 is rotated into an "open" position, the radially extending and flattened distal portion 71 of the rotatable member 70 is oriented such that the distal end of the member 70 may be inserted into a slot or aperture formed in a rotary cutting tool housing. When the lever mechanism 72 is rotated into a "closed" position, the radially extending and flattened distal portion 71 of the rotatable member 70 is rotated so that the rotatable member 70 is relatively securely locked or fastened within the aperture formed in the rotary cutting tool housing.

The attachment 10 also includes a collar 16 that may be coupled to a housing of a rotary cutting tool to secure the attachment 10 to the rotary cutting tool in a second location. In this manner, the attachment 10 may be relatively securely coupled to a rotary cutting tool (e.g., more securely than if a single attachment point was provided to secure the attachment 10 to a rotary cutting tool) and therefore able to withstand greater stress and strain.

According to an exemplary embodiment shown in the FIGURES, the collar 16 has a split structure and a conventional cam closing mechanism 80 (e.g., an over-center latching mechanism or device) which is operated to close the collar 16 tightly around a portion of a rotary cutting tool housing. The cam closing mechanism may also be operated to loosen the collar 16 to remove the rotary cutting tool housing from the collar. To release the attachment 10 from a housing of a rotary cutting tool, the cam closing mechanism 80 is rotated about a hinge 82 to loosen the grip of the collar 16 around a housing of a rotary cutting tool. To secure the attachment 10 to a rotary cutting tool housing, the cam closing mechanism 80 is rotated about the hinge 82 in the reverse direction to close the collar 16 around a portion of the rotary cutting tool housing.

While particular devices and mechanisms are shown in the FIGURES as means to secure the attachment 10 to a rotary cutting tool, other types of mechanisms or devices may be used according to alternative embodiments. For example, according to an exemplary embodiment, one or more portions of the attachment may be relatively securely fastened to a housing of a rotary cutting tool using screws, bolts, or other means (e.g., see the embodiment shown in FIG. 10). According to another alternative embodiment, a portion of the attachment may be inserted directly into an aperture formed in a portion of a rotary cutting tool housing. According to still another exemplary embodiment, the attachment may be coupled to a rotary cutting tool housing at more than two locations (e.g., three or more locations). Any of a variety of mounting mechanisms may be provided to securely couple the attachment to a rotary cutting tool housing.

According to a preferred embodiment, the attachment 10 also includes an aperture or slot 50 in which a tool 52 (e.g., a wrench, etc.) may be stored or positioned. One example of such a configuration is shown in FIGS. 1 through 12. The wrench may be configured to allow a user to tighten or loosen a collet nut 55 or other device or member provided on a rotary cutting tool for securing a tool bit 57 in place. According to alternative embodiments, other types of tools may be provided in an aperture or slot formed in the attachment.

Figure 9:
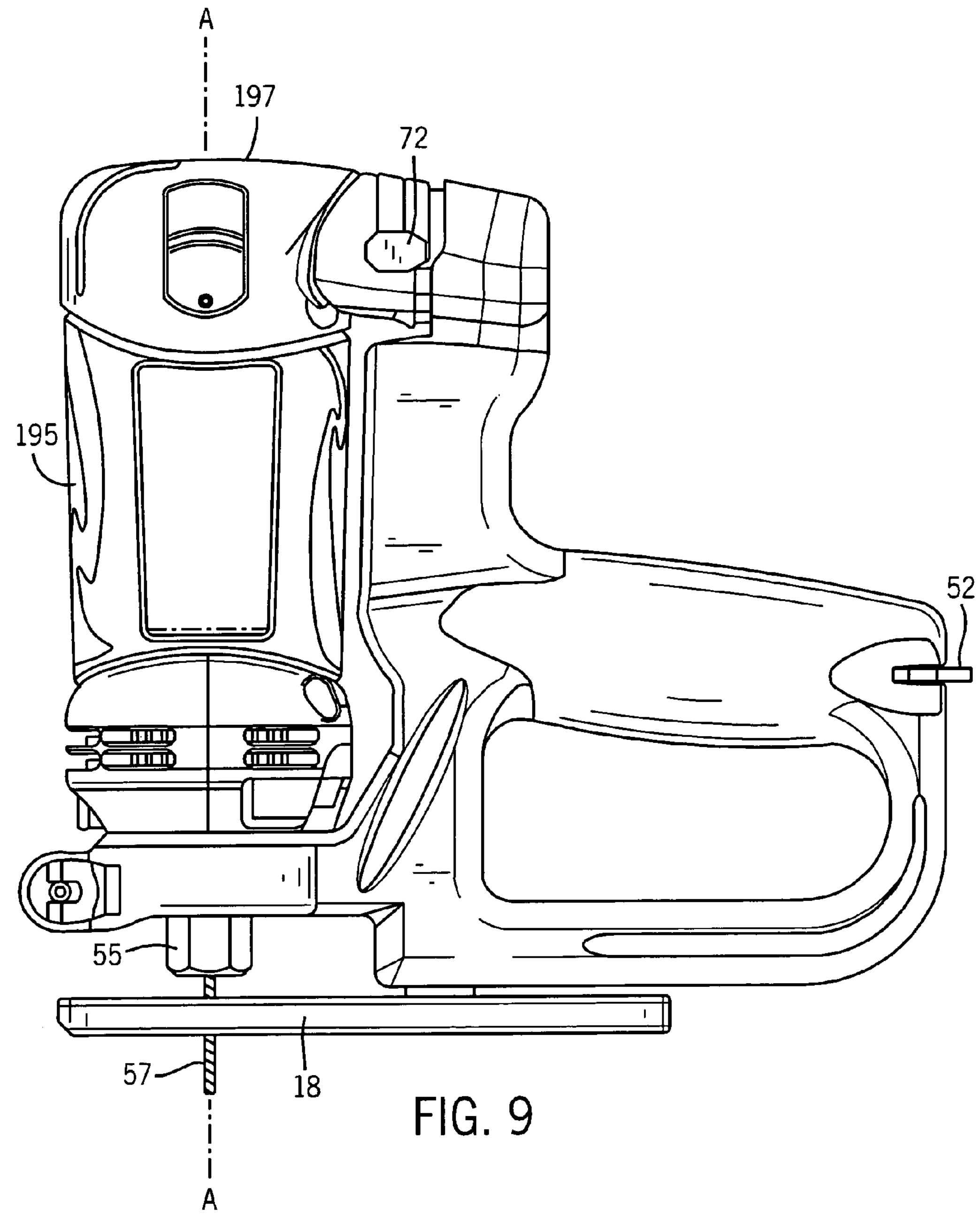
FIG. 9 is a side elevational view of the attachment shown in FIG. 1 and a first rotary cutting tool.

With reference to FIG. 9, the attachment 10 is shown as being coupled to a first rotary cutting tool 195 according to an exemplary embodiment. A top portion 197 of the rotary cutting tool 195 is relatively flush with a top surface of the attachment 10, such that the rotary cutting tool 195 does not extend above a top portion of the attachment 10.

Figure 10:
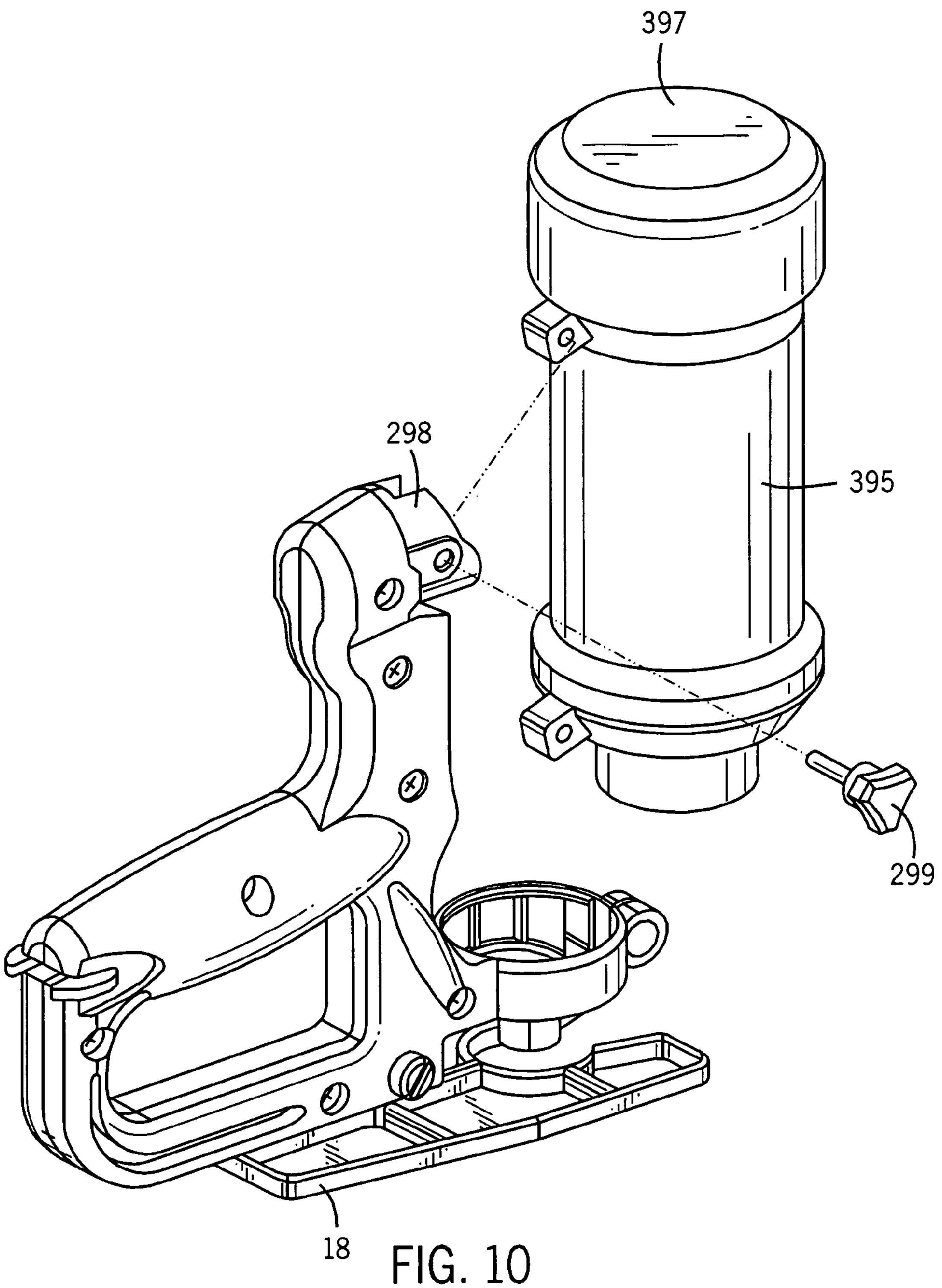
FIG. 10 is a partially exploded rear top perspective view of an attachment according to an exemplary embodiment and a third rotary cutting tool.

With reference to FIG. 1, the attachment 10 is shown as being coupled to a second rotary cutting tool 295 according to another exemplary embodiment. With reference to FIG. 10, the attachment 10 is shown as being coupled to a third rotary cutting tool 395 according to yet another exemplary embodiment. As shown in the FIGURES, top portions 297 and 397 extend above a top surface of the attachment 10.

Figure 8:
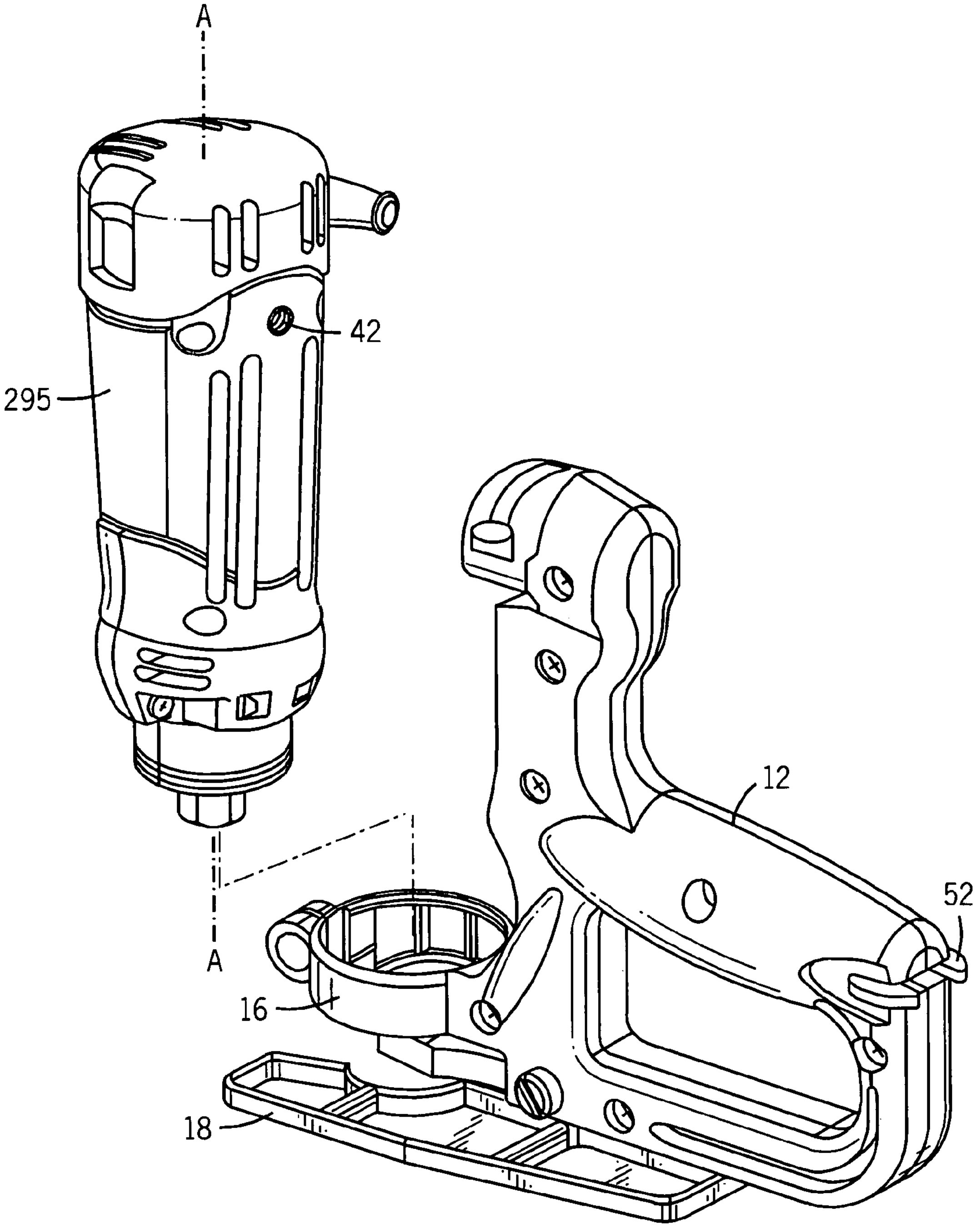
FIG. 8 is a partially exploded rear top perspective view of the attachment and a second rotary cutting tool shown in FIG. 1.

An aperture 42 provided in each of tools 195 and 295 is configured to receive the rotating member 70 of the attachment to relatively securely fasten the attachment 10 to each of tools 195 and 295 (aperture 42 provided in tool 295 is shown in FIG. 8). The aperture 42 is provided in the tools 195 and 295 at a similar position to allow the use of the attachment 10 with either rotary cutting tool 195 and 295. In this manner, the attachment 10 may be adapted or configured to couple or attach to a variety of rotary cutting tools. For example, the attachment 10 may be removed from a first rotary cutting tool and coupled to a second rotary cutting tool without requiring an adapter or a special device to couple the attachment 10 to the rotary cutting tool. Where the rotary cutting tool does not include the aperture 42 for receiving rotating member 70 (e.g., rotary tool 395), an adapter 298 (shown in FIG. 10) may be provided and coupled to the rotary cutting tool by a thumbscrew 299 or other mechanism.

Figure 11:
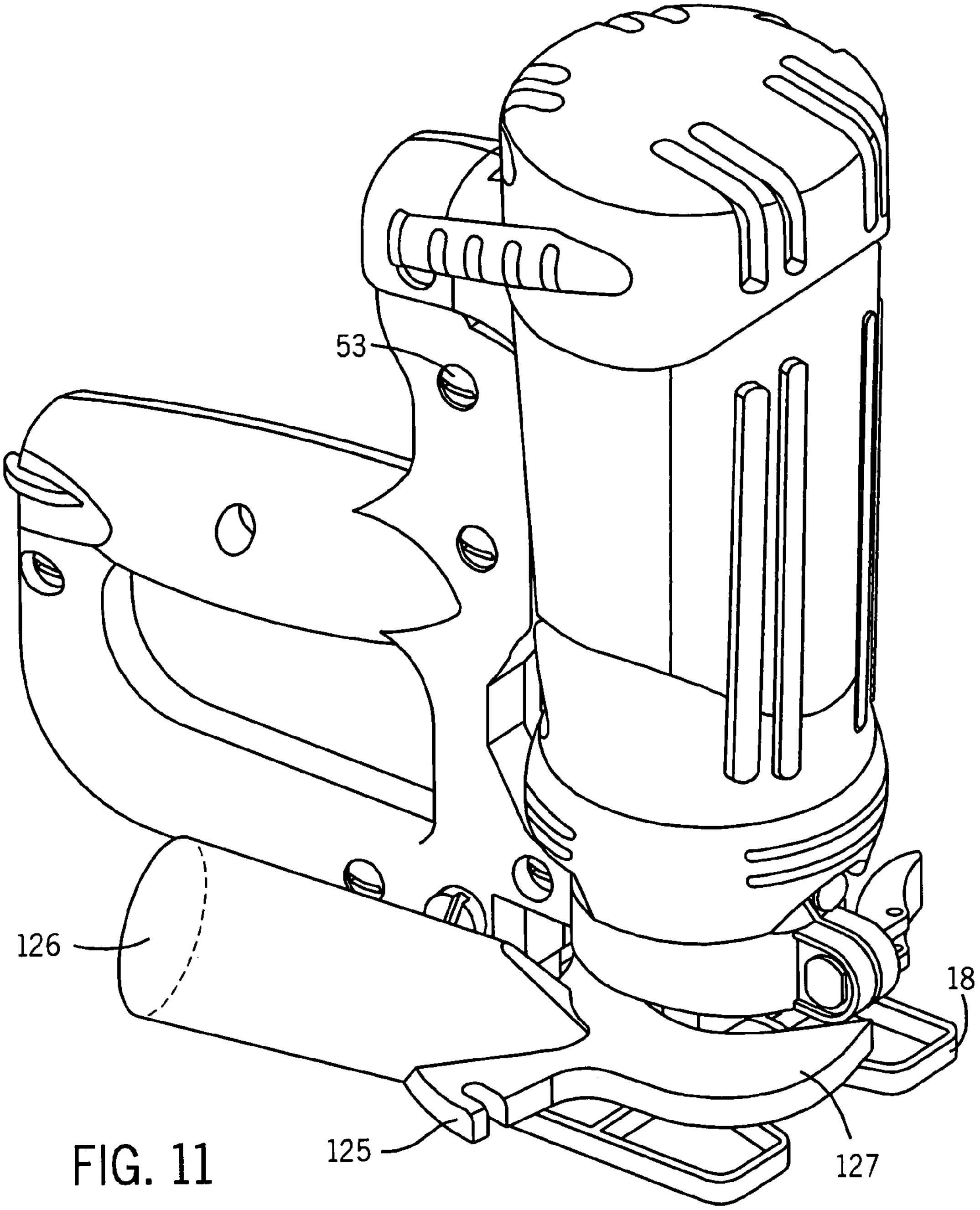
FIG. 11 is a top front perspective view of the attachment shown in FIG. 2 with a dust collection device and the second rotary cutting tool.

FIGS. 11 through 16 show various attachments that may be coupled or connected to the attachment 10. FIG. 11 illustrates a dust collector or collection device 125 that may be coupled to the base 18 of the attachment 10. The dust collector 125 includes an elongated open portion 126 and a collector portion 127. The dust collector 125 is adapted to be connected to a vacuum source so that the user can remove sawdust or other debris from a point of cut while the rotary cutting tool is in use. The elongated open portion 126 may have a size and shape configured to couple to an external dust collection devices (e.g., a vacuum tube or other device) to pull debris away from the point of cut of the rotary cutting tool to which the attachment 10 is coupled. The dust collector 125 may be coupled to the base 18 or to the rotary cutting tool using any conventional method. According to an exemplary embodiment, the dust collector 125 includes features that provide relatively quick and simple attachment of the dust collector 125 to the attachment 10 (e.g., a snap-fit or other means to couple the dust collector 125 to the attachment without the use of tools).

Figure 12:
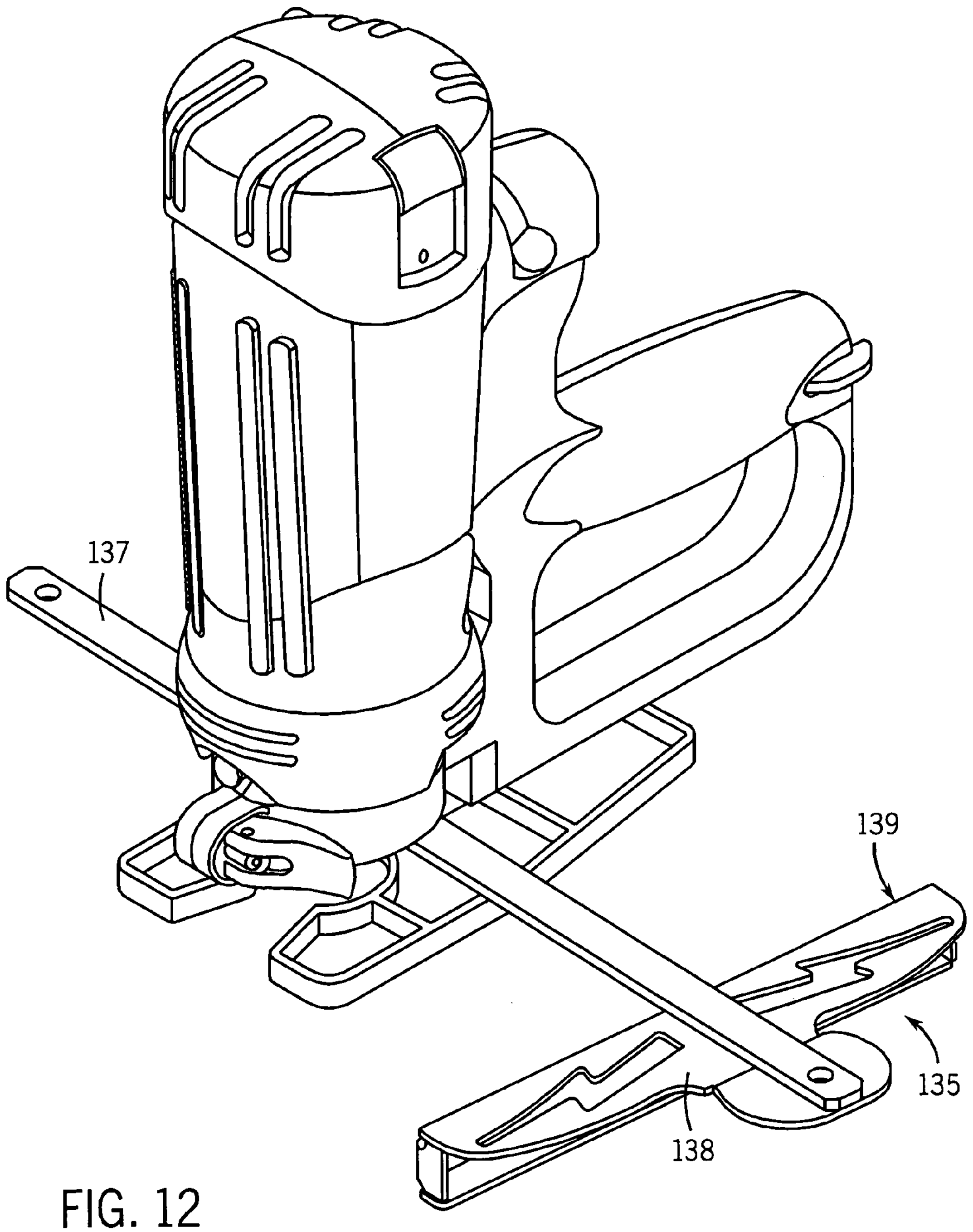
FIG. 12 is a top front perspective view of the attachment and second rotary cutting tool shown in FIG. 11 coupled to an edge guide.
Figure 13:
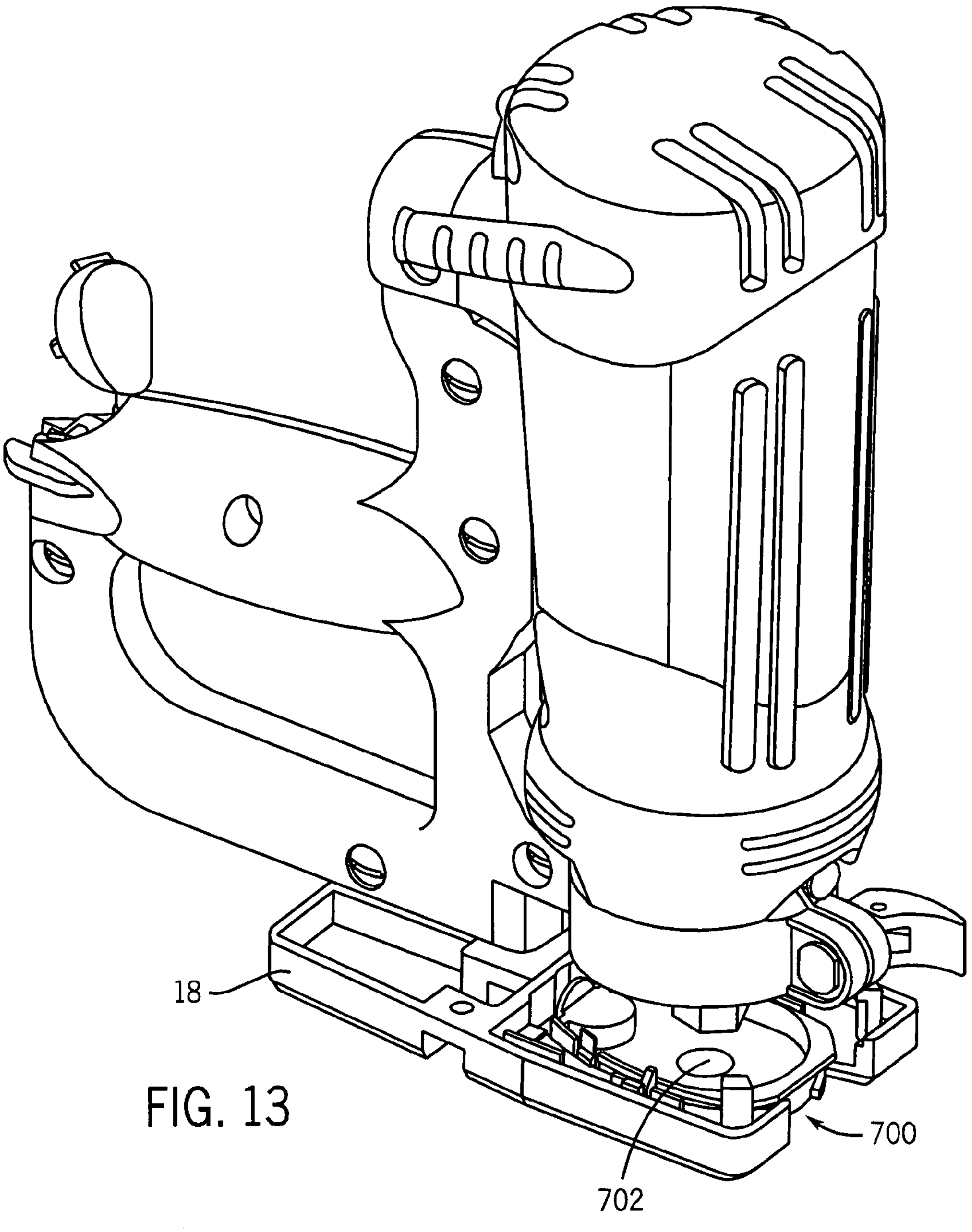
FIG. 13 is a top front perspective view of the attachment and second rotary cutting tool shown in FIG. 11 coupled to a guide or follower.
Figure 14:
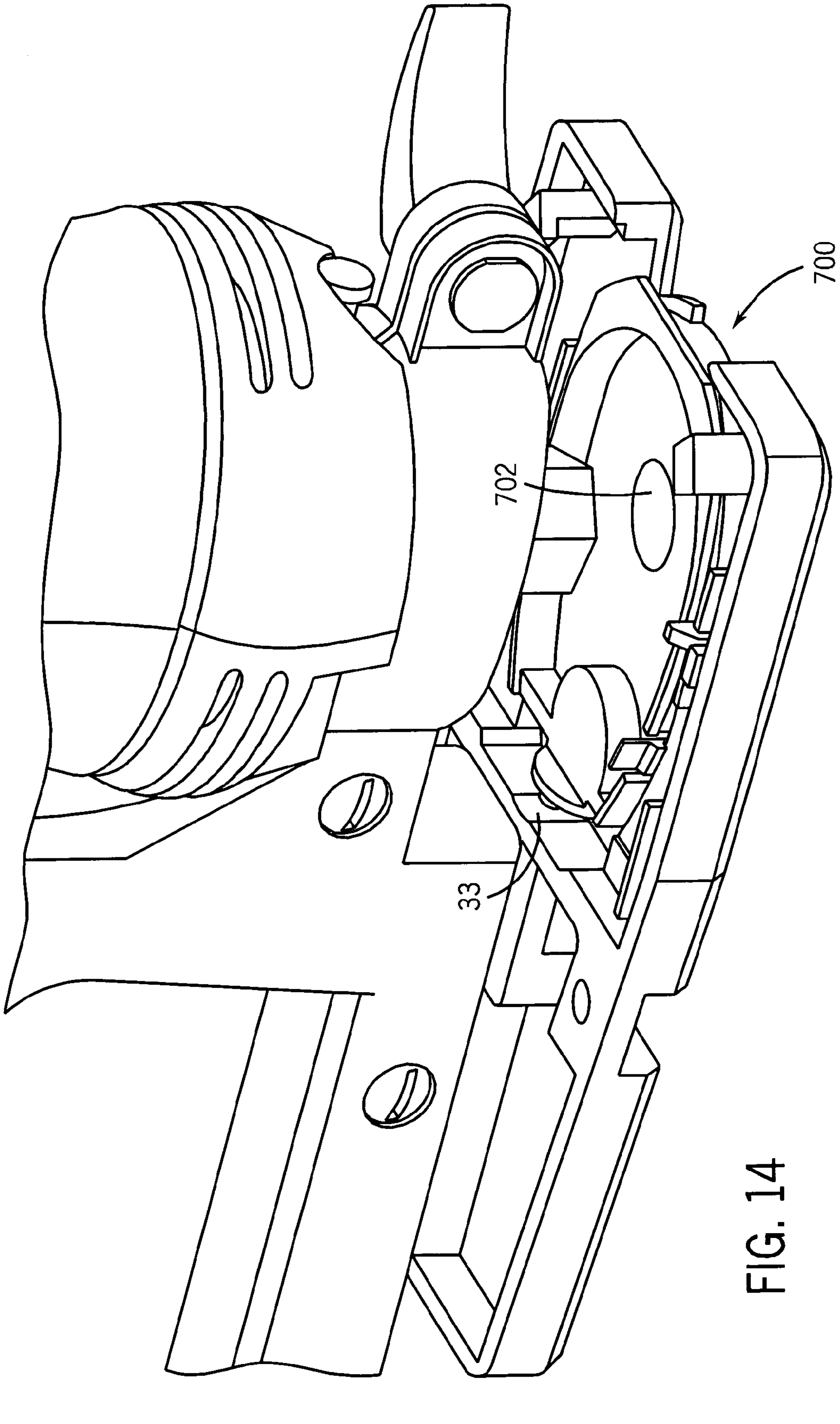
FIG. 14 is a top front perspective view of the attachment and second rotary cutting tool and guide or follower shown in FIG. 13.

FIG. 12 illustrates an edge guide 135 that includes an elongated member 137 (e.g., a bar or shaft, etc.) and a body portion 138 having a face 139 that is configured to abut an edge of a workpiece. The edge guide may be coupled to the attachment 10 using any conventional method. The face 139 of the body portion 138 abuts an edge of a workpiece while the rotary cutting tool and attachment 10 are moved laterally along the surface of the workpiece. In this manner, the edge guide acts as a limit to the distance the rotary cutting tool may be moved away from the edge of the workpiece, which enables a user of the workpiece to form a relatively straight cut in the workpiece at a fixed distance from the edge of the workpiece.

Figure 15:
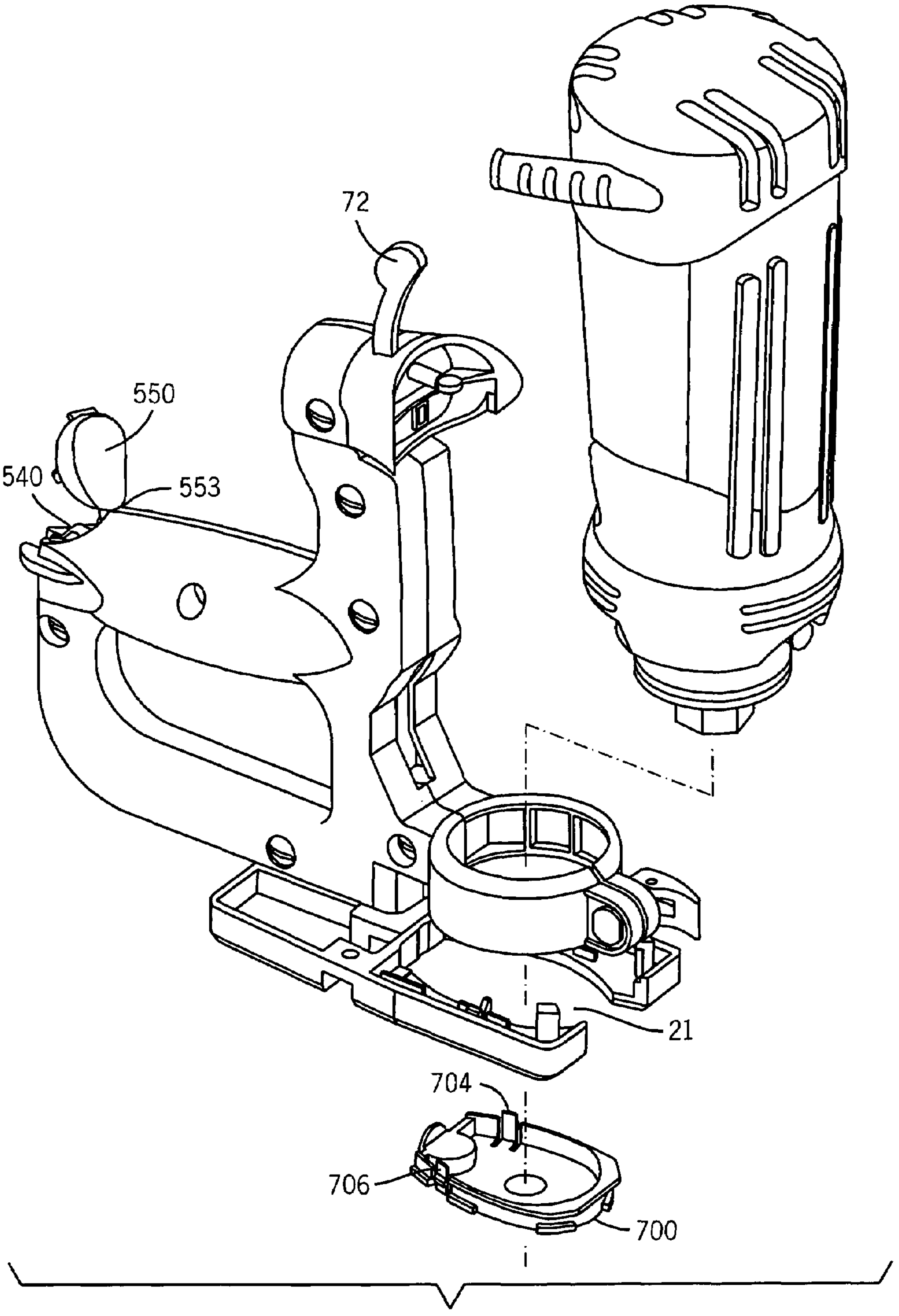
FIG. 15 is a partially exploded top front perspective view of the attachment and second rotary cutting tool and guide or follower shown in FIG. 13.
Figure 16:
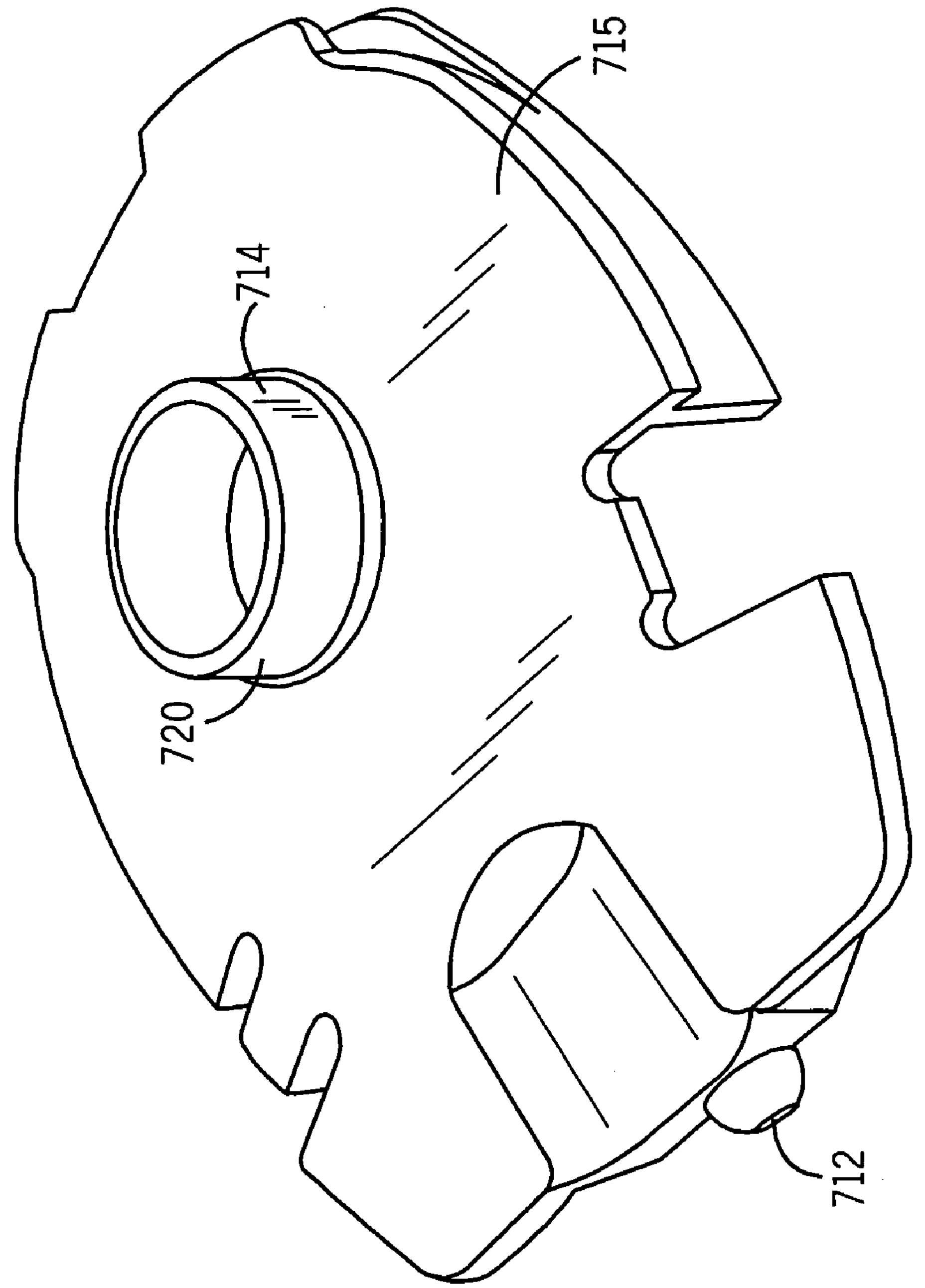
FIG. 16 is a bottom rear perspective view of the guide or follower shown in FIG. 11.

FIGS. 13 through 16 show attachment 10 being used in conjunction with a device 700 (e.g., a guide or follower) configured act as a guide for the attachment 10 and rotary cutting tool. Guide 700 includes an aperture or passage 702 formed therethrough which is adapted or configured to receive a tool bit coupled to the rotary cutting tool. An extension 714 (as best shown in FIG. 16) extends from a bottom surface 715 of the guide 700, and defines a portion of the aperture 702.

Guide 700 is configured for coupling to the base 18 of the attachment 10. According to an exemplary embodiment, the guide 700 is received in an aperture or cutout 21 provided in the base 18. According to an exemplary embodiment, base 18 includes complimentary features for engaging features provided on guide 700 (e.g., clips or connectors 704 and 706 and rib 712). For example, clips or connectors 704 and 706 include a portion or member 711 that is configured to engage a top surface 31 of the base 18 to secure the guide 700 in place relative to the base 18. Rib 711 engages a cutout or channel 33 provided in the base 18. In this manner, the guide 700 is relatively securely coupled to the base 18 during operation of the rotary cutting tool. Any of a variety of connectors may be used to couple the guide to the base according to alternative embodiments. Further, the attachment 10 may be configured with a variety of complimentary features for coupling the guide to the base 18. Further, a different number of connectors may be provided than shown in the FIGURES. According to an alternative embodiment, a guide may be integrally formed with a base for an attachment.

Referring to FIG. 16, the extension 714 includes an outer surface or wall 720 that may abut a feature or edge of a template during a cutting operation being performed on a workpiece. When the guide 700 is coupled to the base 18 of the attachment 10, the extension 714 extends below a bottom surface 19 of the base 18. The outer surface 720 of the extension 714 may be positioned to abut a feature or edge of the template while the bottom surface 19 of the base 18 rests along another feature or surface of the template (e.g., a top surface of a template or workpiece). Moving the attachment 10 and rotary cutting tool with the outer surface 720 of the extension 714 abutting a feature or edge of the template acts to maintain a prescribed distance between a tool bit and the feature or edge (i.e., a tool bit extending through the extension is provided) from the outer surface of the extension 714, which allows the tool bit to make cuts in a workpiece that follow the shape of the feature or edge of the template.

According to an exemplary embodiment, a tool bit 57 coupled to the rotary cutting tool (e.g., using a chuck assembly or a collet-type assembly) is arranged such that the tool bit 57 is provided in the center of the aperture 702. According to an alternative embodiment, the tool bit may be arranged at a location other than the center of the aperture 702. Further, while the aperture 702 and the extension 714 are shown as having a generally circular shape, according to alternative embodiments, the aperture and extension may have other shapes (e.g., ovular, square, rectangular, or any other suitable shape).

FIGS. 15 and 17 through 21 are schematic views illustrating a variety of configurations for storage trays or compartments that may be provided or included in the attachment 10. It should be noted that the base 18 shown in FIGS. 1 through 15 may not be shown in FIGS. 17 through 21, although such a feature may be provided. It should be noted that any storage tray or compartment features illustrated in FIGS. 15 and 17 through 21 may be provided in the attachment 10 shown in FIG. 1 and the other views of the attachment according to various preferred and exemplary embodiments shown and described herein.

Figure 17:
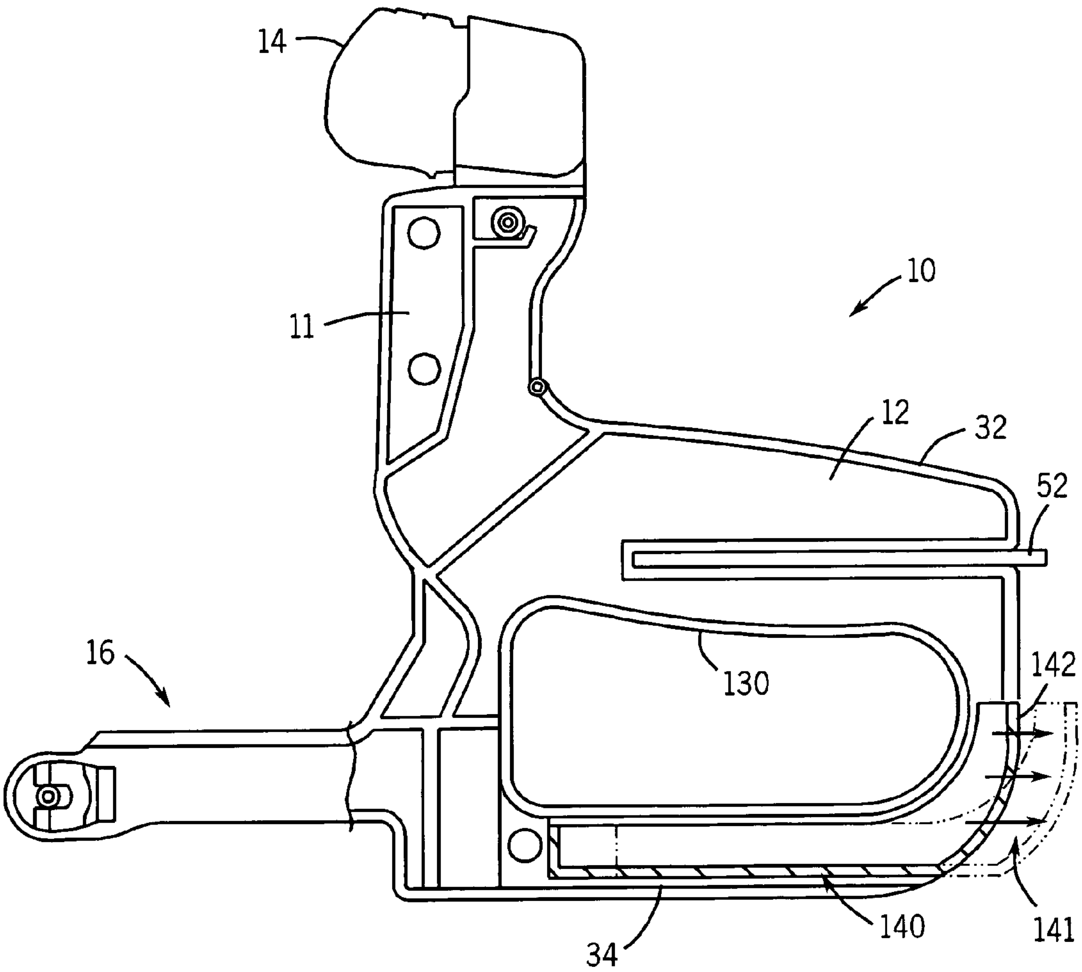
FIG. 17 is a cross-sectional view of an attachment similar to that shown in FIG. 2 and having a storage tray or compartment provided therein according to a first exemplary embodiment.

FIG. 17 shows a side view of the attachment 10 having a storage tray or compartment 140 according to a first exemplary embodiment. The storage tray 140 is provided in the bottom portion 34 of the attachment 10 and defines a chamber or container in which a variety of tools (e.g., screws, tool bits, etc.) may be stored or placed. Such a storage tray provides relatively convenient access to tools that may be used during use of the rotary cutting tool and attachment. The size and shape of the storage tray may differ from that shown in FIG. 17 according to alternative embodiments.

According to a preferred embodiment, the storage tray 140 may be removed from the attachment 10 by sliding the storage tray 140 away from the attachment 10 in a direction substantially parallel to the axis of the bottom portion 34 (illustrated by arrows 141). A surface 142 of the storage tray 140 forms a portion of the outer surface of the attachment 10. A clip or other device (not shown) may be provided on a surface of the storage tray 140 to relatively securely retain the storage tray 140 within the attachment. For example, a resiliently flexible member such as a clip may be provided to engage a feature in the attachment when the storage tray is inserted into the attachment. It is intended that such a feature may reduce the tendency of the storage tray to come loose from the attachment during use.

According to an alternative embodiment, the storage tray may be removed by sliding the storage tray away from the attachment in a direction substantially perpendicular to the axis of the bottom portion 34 (e.g., perpendicular to the arrows 141). In this embodiment, a bottom surface of the tray may form a portion of the exterior surface of the attachment. According to another alternative embodiment, the storage tray may be coupled to the attachment by a hinge, such that the storage tray is not entirely removable from the attachment (e.g., the storage tray rotates away from the attachment about a hinge or other structure). Such a hinge may be a living hinge or a mechanical-type hinge.

Figure 18:
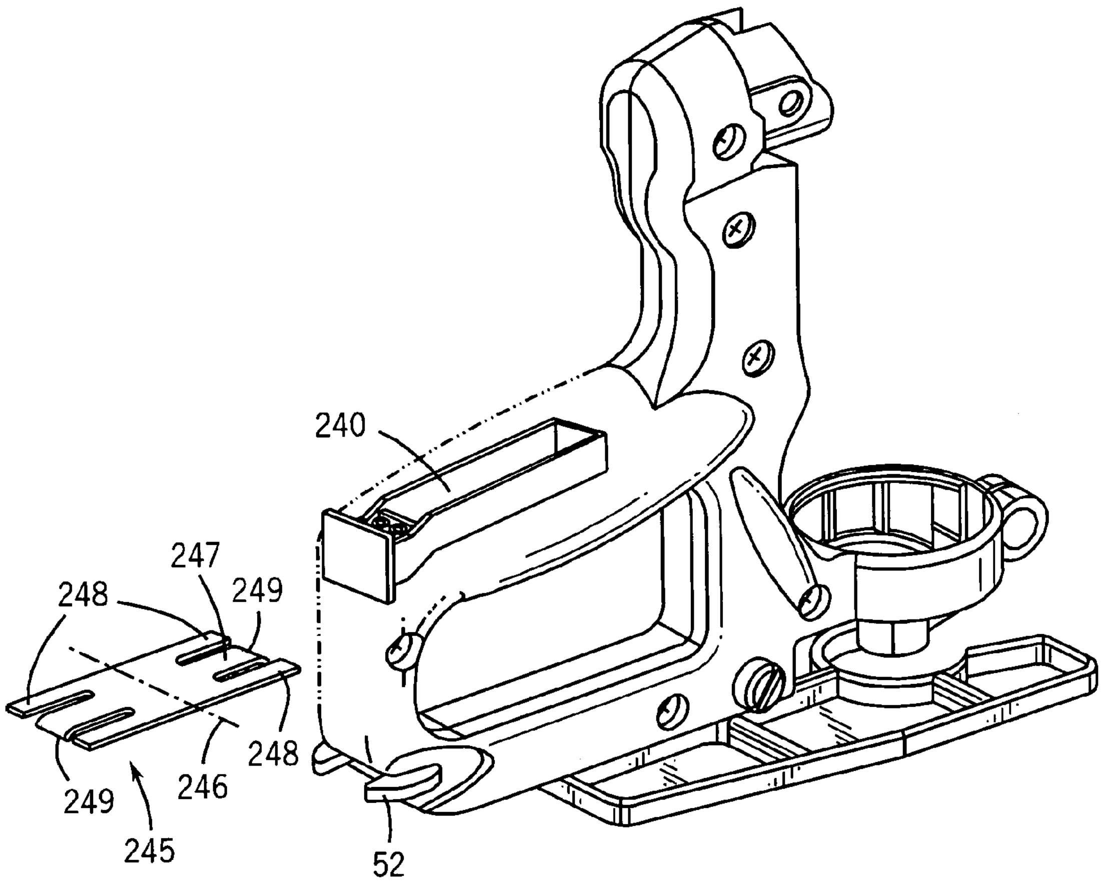
FIG. 18 is a top rear perspective view of an attachment similar to that shown in FIG. 2 having a storage tray or compartment provided therein according to a second exemplary embodiment and including a clip that provides a relatively secure attachment of the storage tray or compartment to the attachment.
Figure 19:
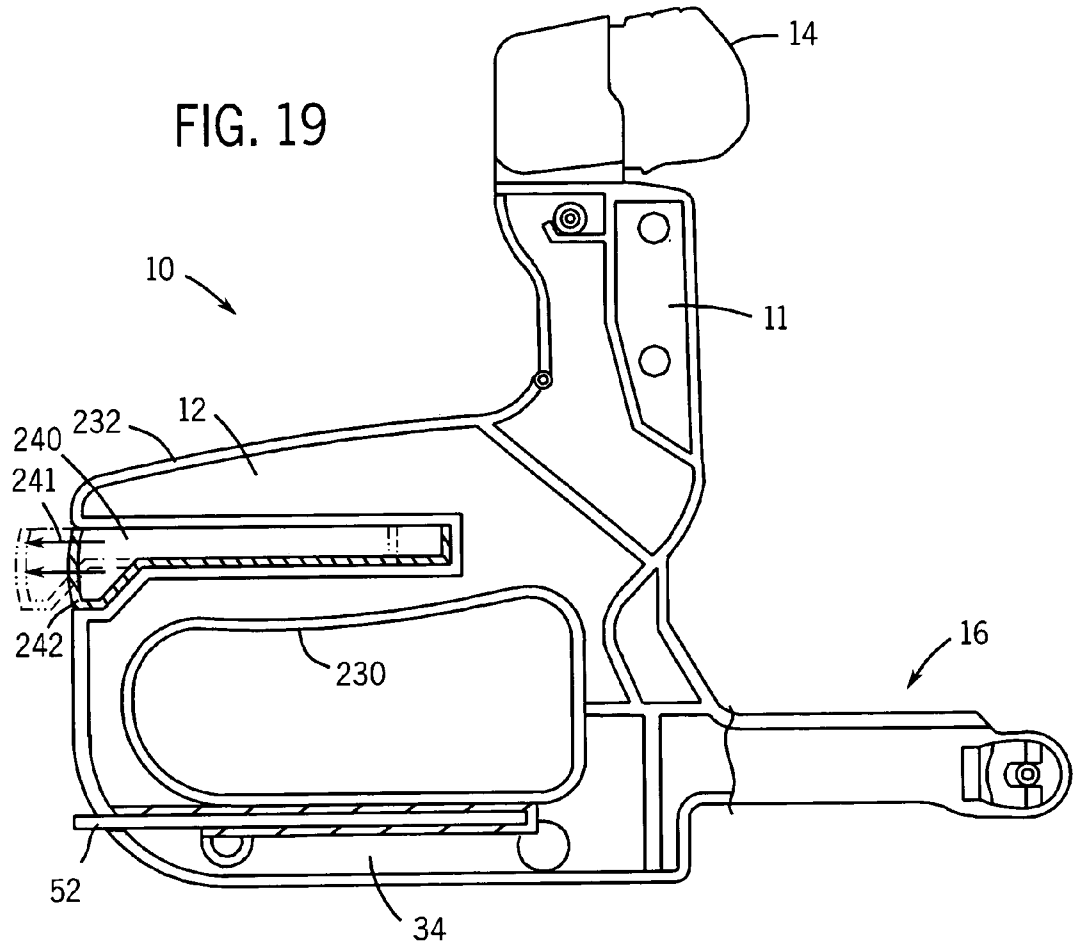
FIG. 19 is a cross-sectional view of an attachment similar to that shown in FIG. 2 and having a storage tray or compartment provided therein according to the second exemplary embodiment shown in FIG. 18.

Referring to FIGS. 18 and 19, the attachment 10 is shown having a storage tray or compartment according to a second exemplary embodiment. The storage tray 240 is provided in the handle portion 12 of the attachment 10. The size and shape of the storage tray may differ from that shown in FIGS. 18 and 19 according to alternative embodiments.

According to a preferred embodiment, the storage tray 240 may be removed from the attachment 10 by sliding the storage tray 240 away from the attachment 10 in a direction substantially parallel to the axis of the handle 12 (illustrated by arrows 241). A surface 242 of the storage tray 240 forms a portion of the outer surface of the attachment 10. FIG. 18 also shows a top and side view of the storage tray 240 removed from the attachment. As shown, a plurality of tool bits 57 may be stored within the storage tray 240. A rib or protrusion may be provided to define separate portions of the chamber or container defined by storage tray 240, and may act to elevate a portion of a tool bit stored within the storage tray 240 to allow easier grasping of the tool bits by a user of the attachment 10.

Referring to FIG. 18, an optional clip 245 is shown removed from a bottom surface of the storage tray 240. The clip 245 may be coupled or attached to the bottom surface of the storage tray 240 by any acceptable means (e.g., adhesive, mechanical fasteners such as screws and the like) or may be integrally formed with the storage tray 240. The clip 245 may have two portions on either side of the dashed line 246 that are substantially symmetrical or may have only one of the sides (e.g., the portion to the right of the dashed line). A resiliently flexible member 247 is provided between two stationary members 248 and is configured to engage a complementary feature provided within the attachment 10. The resiliently flexible member 247 may include a rounded portion 249 that forces the resiliently flexible member 247 to flex outward from the plane of the clip 245 when the storage tray 240 is inserted into the attachment 10. Any of a variety of configurations for clips may be used to relatively securely retain the storage tray within the attachment 10, and the clip shown is intended to be exemplary only.

Figure 21:
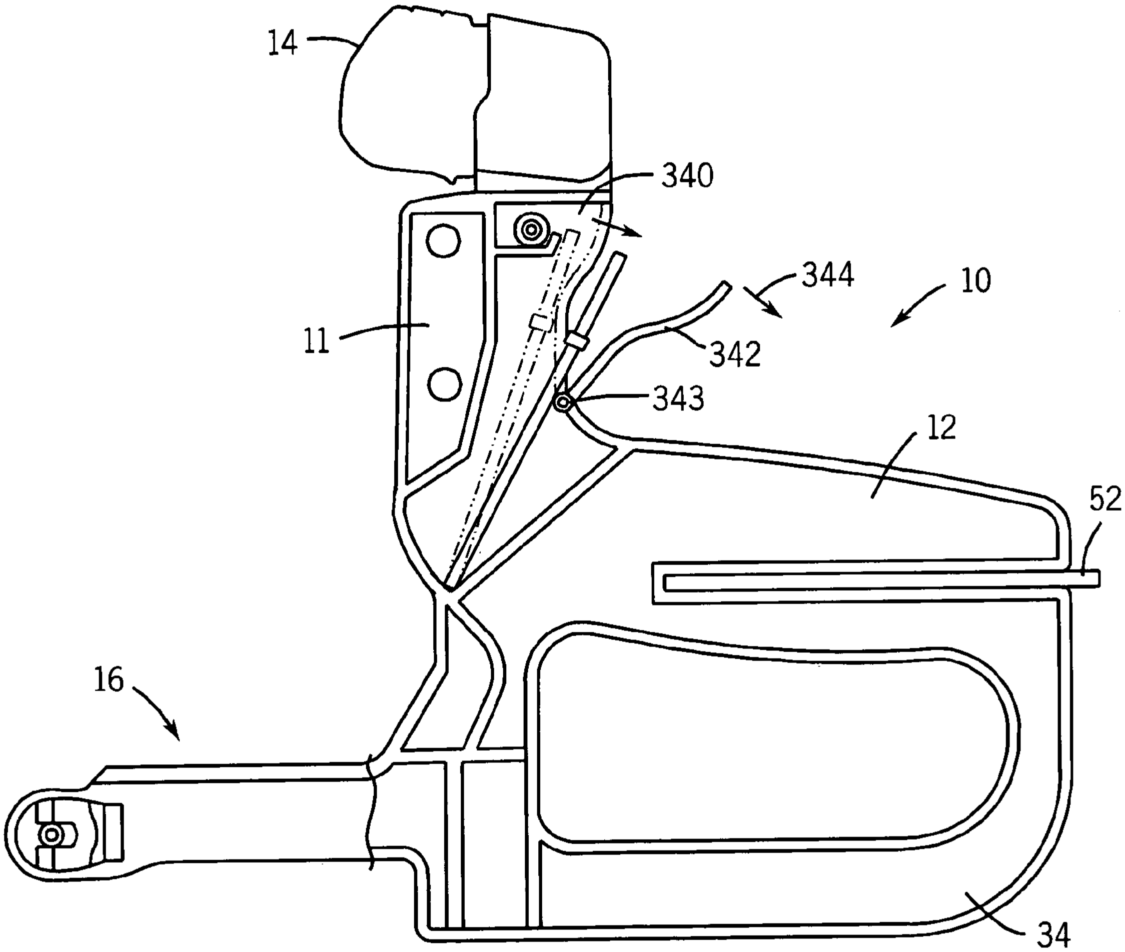
FIG. 21 is a cross-sectional view of an attachment similar to that shown in FIG. 2 and having a storage compartment provided therein according to a fourth exemplary embodiment.

FIG. 21 is a side view of the attachment 10 having a storage compartment 340 according to a third exemplary embodiment. The storage compartment 340 is shown as being formed as a chamber provided within the body 11 of the attachment 10. In this manner, the storage compartment may be integrally formed as a portion of the attachment such that a separate piece (e.g., a removable tray) is not required. A flip cover or door 342 is coupled to the attachment 10 by a hinge 343 that allows the flip cover 342 to rotate away from the attachment 10 about the hinge 343 (indicated generally by arrow 344). The hinge 343 may be a living hinge or a conventional mechanical-type hinge. The flip cover 342 forms a portion of the exterior surface of the attachment 10, and may be rotated away from the body 11 of the attachment to allow access to the storage compartment 340.

Figure 20:
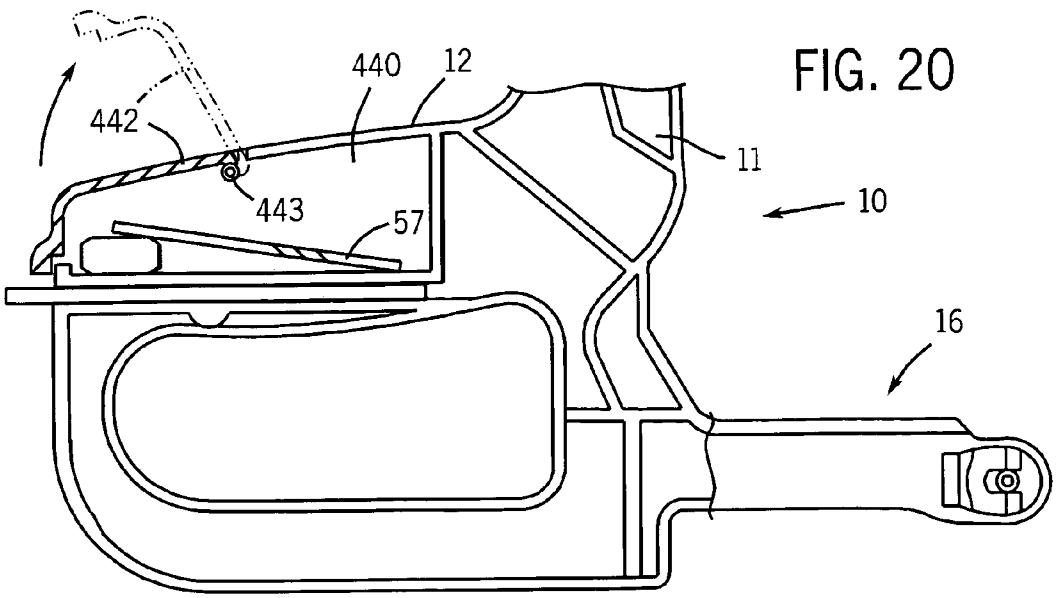
FIG. 20 is a cross-sectional view of an attachment similar to that shown in FIG. 2 and having a storage compartment provided therein according to a third exemplary embodiment.

While FIG. 21 shows a storage compartment formed within a substantially vertical portion of the body 11 of the attachment 10, FIG. 20 shows a storage compartment 440 formed within a handle 12 of an attachment 10. A flip cover 442 is provided and rotates about a hinge 443 to allow access to the storage compartment 440. The hinge 443 may be a living hinge or mechanical-type hinge. Flip cover 442 may be dimensioned to define a substantial portion of the top surface of the handle 12 thereby providing greater access to the tools stored within the storage compartment 440 (e.g., a user's fingers may reach into the compartment to remove tools). In contrast, flip cover 442 may be dimensioned to define only a small portion of the top surface of the handle 12 thereby limiting access to the tools stored within the storage compartment 440 (e.g. items stored in the storage compartment 440 may not be accessible by a user's fingers, and must be dumped out of the storage compartment by rotating the attachment to allow the items to fall out of the compartment).

FIG. 15 shows the attachment 10 having a storage compartment provided therein according to another exemplary embodiment. A flip cover or door 550 is provided toward a rear of the handle 12. The flip cover 550 is coupled to the handle 12 by a hinge mechanism 553 to allow the flip cover 550 to rotate outward and away from the handle 12. A storage compartment 540 is thus provided within the handle 12.

As shown throughout the FIGURES, a rotary cutting tool may be converted from a rotary cutting tool having no handle (see, e.g., FIGS. 8 and 10 showing rotary cutting tools exploded from the attachment) to a rotary cutting tool having a handle that is substantially perpendicular to the longitudinal axis of the rotary cutting tool (e.g., in a "jigsaw-like" arrangement). A user of the rotary cutting tool may remove the attachment 10 from the rotary cutting tool to form cuts in a workpiece. For example, the user may wish to make freehand cuts in a workpiece or make cuts in a material in a relatively cramped or confined space that requires a relatively small tool. Alternatively the benefits of using a handle having a gripping surface that is relatively and parallel to the plane of the surface of the workpiece may be obtained by mounting perpendicular to the axis of the rotary cutting tool, the attachment 10 to the rotary cutting tool. The attachment may include a base that allows the user to adjust the height of a tool bit coupled to the rotary cutting tool. In this manner, a rotary cutting tool may be converted between a rotary cutting tool having no handle to a rotary cutting tool having a handle relatively perpendicular to the axis of the rotary cutting tool.

Figure 22:
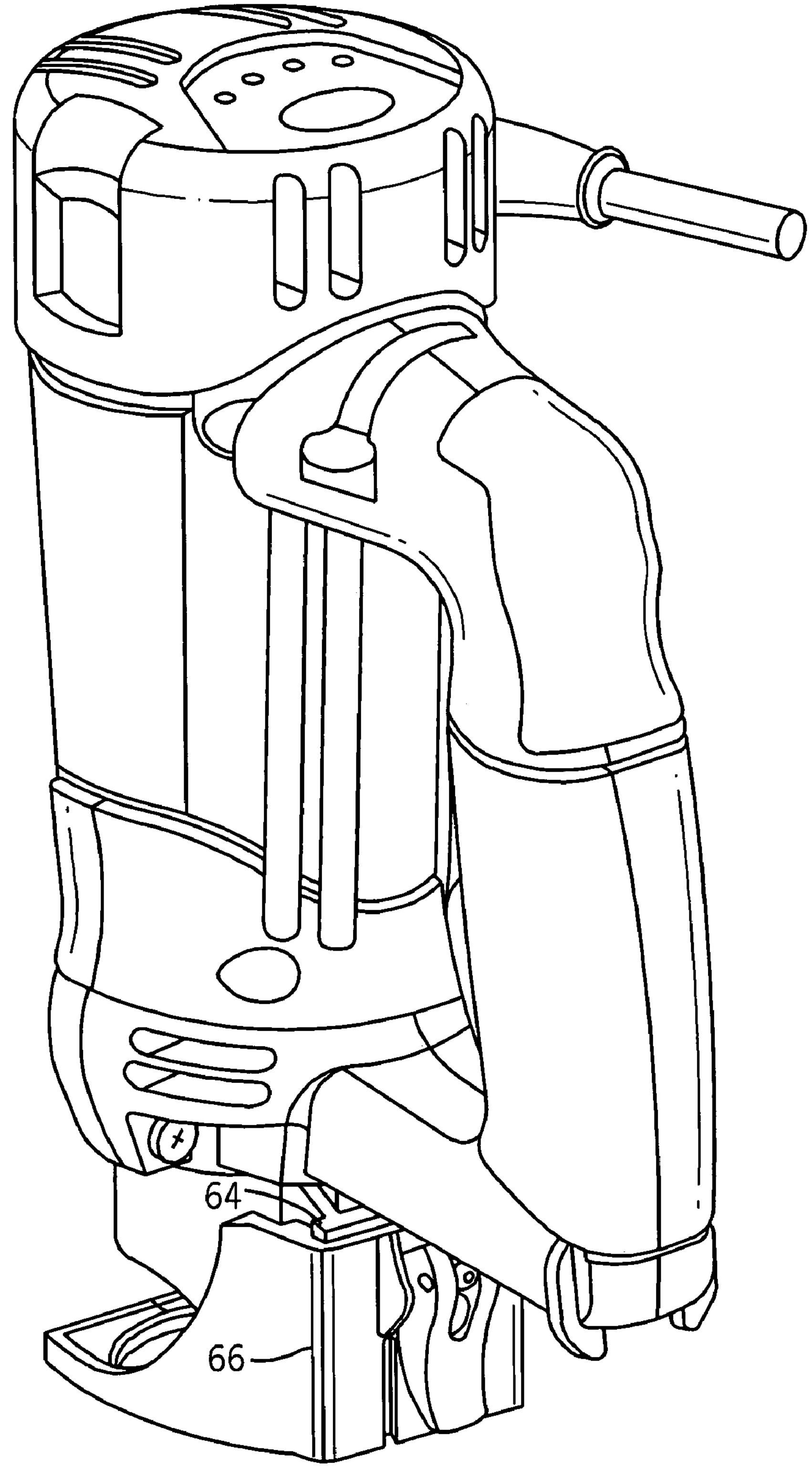
FIG. 22 is a top rear perspective view of a rotary cutting tool coupled to a second attachment according to an exemplary embodiment and a depth guide.

The rotary cutting tool may also be configured for conversion to a rotary cutting tool having a handle that is substantially parallel to the axis of the rotary cutting tool. FIG. 22 shows such a handle for use with a rotary cutting tool. The handle includes a rotatable member 70 similar to that provided in the attachment 10. The handle also includes fixed mounting structures that are adapted for insertion on a slot provided in the housing of the rotary cutting tool. According to an alternative embodiment, the fixed mounting structures may be replaced with a collar similar to that provided on the attachment 10. The handle provides a gripping surface that is substantially parallel to the axis of the rotary cutting tool and in a particular embodiment may be adapted to couple to the rotary cutting tool in a manner similar to that used for the attachment 10. In this manner, the rotary cutting tool may be convertible not only between a rotary cutting tool having no handle and a rotary cutting tool having a handle that is substantially perpendicular to the body of the rotary cutting tool, but also to a rotary cutting tool that has a handle that is substantially parallel to the longitudinal axis of the rotary cutting tool. This convertibility allows users of the rotary cutting tool enhanced flexibility in terms of handling and maneuverability of the rotary cutting tool. For example, in certain applications it may be desirable to form cuts in a manner similar to the way that jigsaws operate. In such a case, the attachment 10 may be coupled to the rotary cutting tool to provide one or more of the advantages described above. In another application, it may be desirable to provide a handle that is substantially parallel to the axis of the rotary cutting tool. In these cases, a different handle may be coupled to the rotary cutting tool that provides such a feature.

Figure 24:
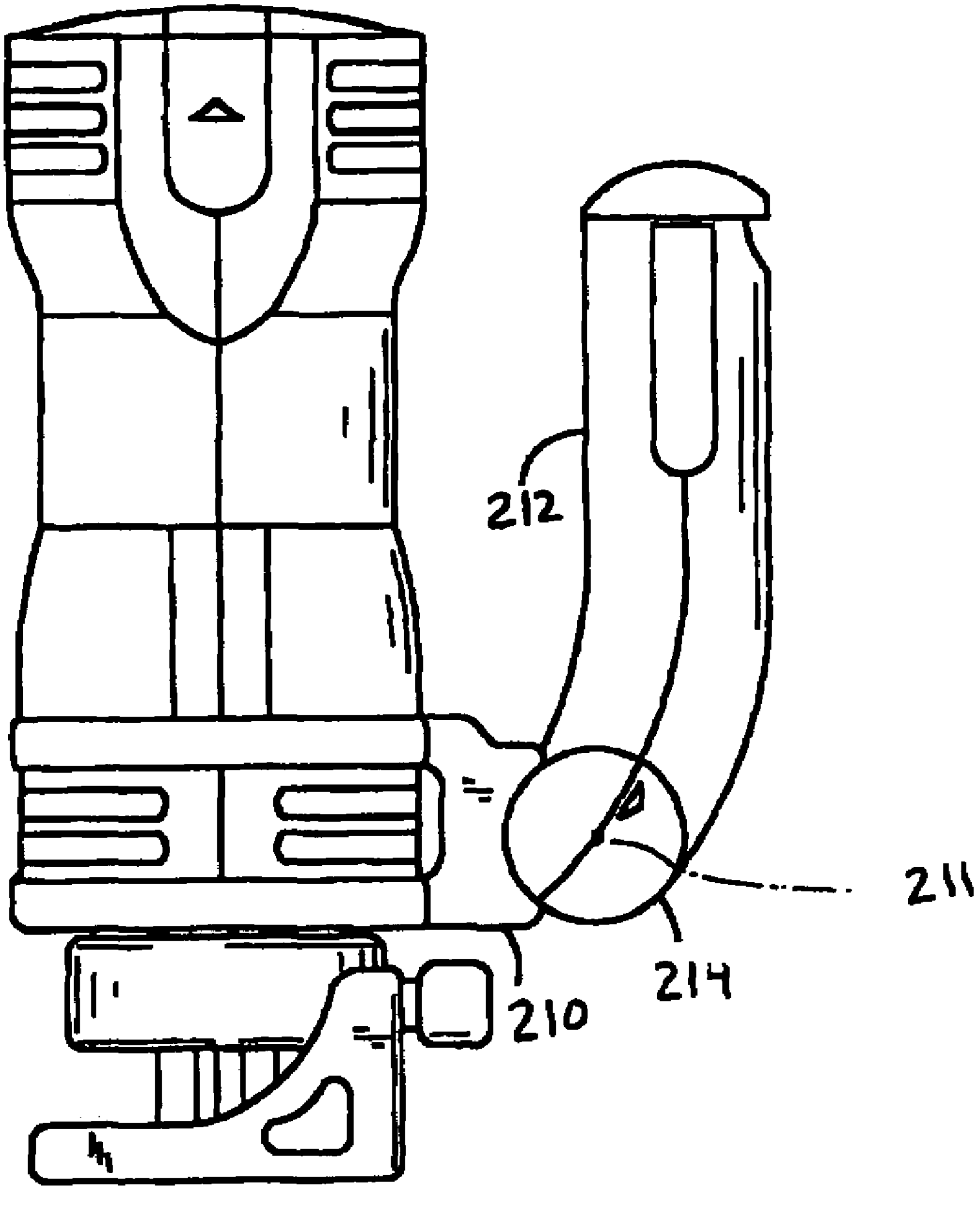
FIG. 24 is a side view of an attachment according to an exemplary embodiment having a handle provided in a substantially parallel arrangement with respect to the body of a rotary cutting tool to which the attachment is coupled.

While the above description contemplates the use of two separate attachments having handles with two different orientations for providing a handle for a rotary cutting tool that is either parallel or perpendicular to the axis of the rotary cutting tool, according to an alternative embodiment a single attachment 210 may provide both a parallel and a perpendicular gripping surface for a rotary cutting tool (shown in FIG. 24). For example, the attachment 210 may include a handle (and corresponding gripping surface) that is rotatable about a hinge to change between a handle that is substantially parallel to the axis of the rotary cutting tool and a handle that is substantially perpendicular to the axis of the rotary cutting tool and all positions in-between these two extremes. Such a handle may be adjustable to any position between parallel and perpendicular to the axis of the rotary cutting tool, and may be secured in fixed relation to the rotary cutting tool housing using screws, bolts, thumb-screws, or any other suitable mechanism.

FIG. 24 is a side view of the attachment 210 in accordance with this alternative embodiment. The attachment 210 includes a handle 212 that is rotatable about an axis (extending out of the plane of the paper in FIG. 24). The handle 212 may be coupled with a hinge 214 or other device to enable rotation of the handle 212 about the axis. As shown in FIG. 24, the handle 212 may be arranged in a position substantially parallel to the body of a rotary cutting tool to which the attachment 210 is coupled. The handle 212 may be rotated about axis 211 to orientate the handle 212 in a position substantially perpendicular to the body of the rotary cutting tool to which the attachment 210 is coupled.

According to an exemplary embodiment, the handle 212 may be arranged in any position between the parallel arrangement and the perpendicular arrangement. According to an alternative embodiment, the handle 212 may be positioned either substantially parallel or substantially perpendicular to the body of the rotary cutting tool to which the attachment is coupled, and may not be positioned between the substantially parallel and the substantially perpendicular arrangements.

While the attachment 210 is shown as being coupled to the rotary cutting tool at a single point (e.g., by a ring at least partially surrounding a portion of the rotary cutting tool), according to other embodiments an attachment having a rotatable handle may be configured for coupling to a rotary cutting tool at more than one point (e.g., similar to the attachment shown in FIG. 1, such that a handle similar to handle 212 may rotate about an axis between substantially parallel and perpendicular arrangements). Any of a variety of configurations for an attachment having such a rotatable handle may be utilized, and the particular design may depend on a variety of factors (e.g., cost, manufacturability, etc.).

Figure 23:
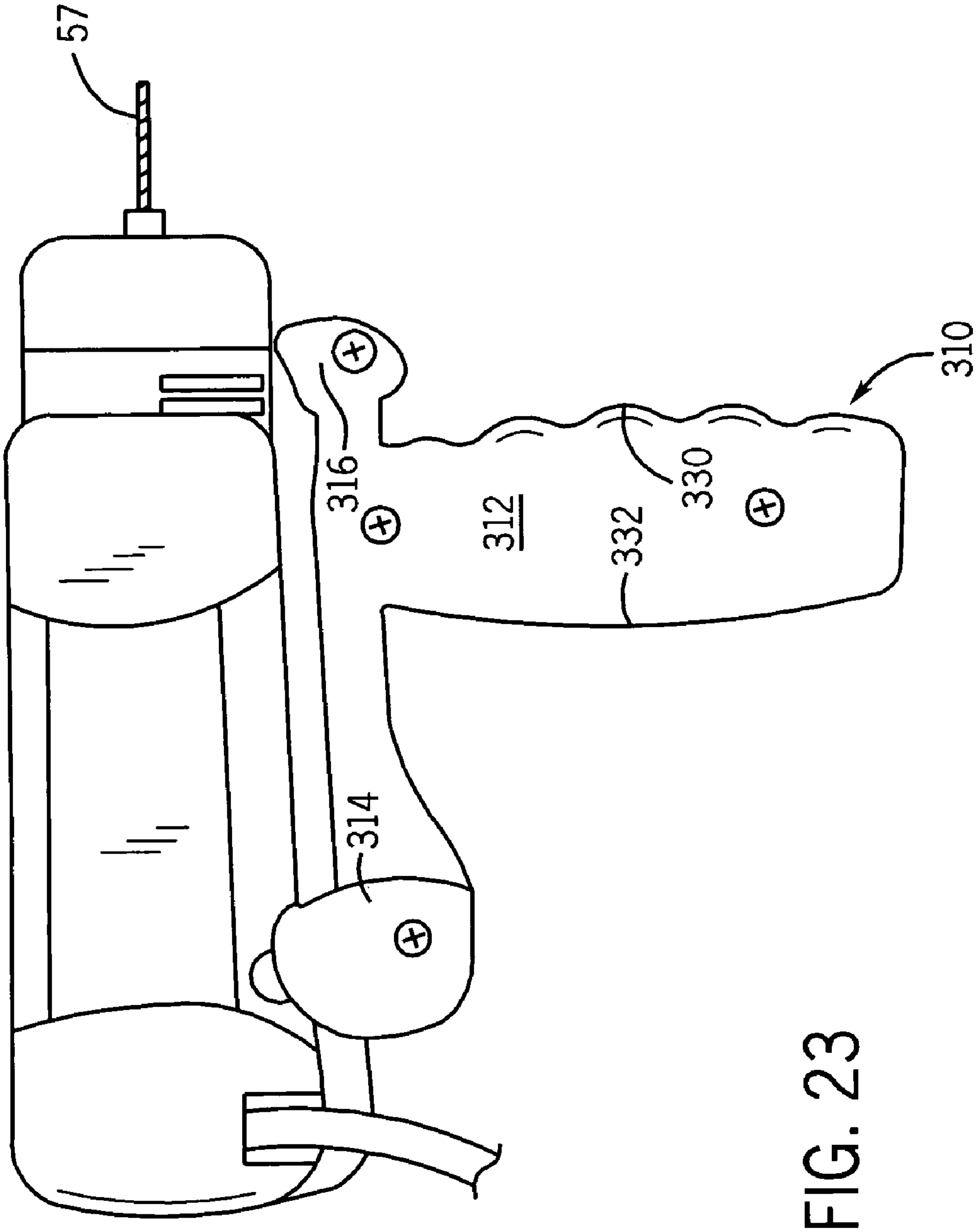
FIG. 23 is a side view of a third attachment according to an exemplary embodiment coupled to a rotary cutting tool.

FIG. 23 shows an attachment 310 for a rotary cutting tool according to an alternative embodiment. The attachment 310 includes a handle 312 extending substantially perpendicular to the axis of a rotary cutting tool to which it is coupled or attached, and includes a front grip surface 330 and a rear surface 332. The attachment 310 is coupled to a rotary cutting tool with a first attachment mechanism 314 and a second attachment mechanism 316. The attachment mechanism 314 may include features similar to those described above with respect to mechanism 14 shown in FIG. 2 or may differ therefrom. Any acceptable means of coupling the handle 312 to a rotary cutting tool may be used. One advantageous feature of providing two connection points to the rotary cutting tool (e.g., the first and second attachment mechanisms 314 and 316) is that the handle 312 may be relatively securely fastened to the rotary cutting tool as compared to removable/detachable handles that are coupled to rotary cutting tools at only a single point.

One advantageous feature of providing an attachment such as the attachment 310 is that the attachment may be used with existing components that may be provided with a rotary cutting tool. For example, by coupling the attachment 310 to the rotary cutting tool shown in FIG. 23, a separate depth guide 66 as shown in FIG. 22 shown may be used concurrently with the attachment 510. In contrast, if an attachment such as that shown in FIG. 2 were to be coupled to the rotary cutting tool, the depth guide 66 shown in FIG. 22 could not be used due to the coupling of the attachment using collar 16, which couples to a portion of the rotary cutting tool housing that is also used for coupling with the depth guide 66 shown in FIG. 22. Another advantageous feature of providing an attachment such as the attachment 310 is that such an attachment includes fewer components (and hence, less material) and is therefore simpler and more inexpensive to manufacture.

The construction and arrangement of the elements of the attachment as shown in the preferred and other exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials in any of a wide variety of colors, textures and combinations. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the scope of the present invention as expressed in the appended claims.

What is claimed is:

1. An attachment for selective coupling to a rotary cutting tool, the attachment comprising:

a body comprising a handle that is substantially perpendicular to a central longitudinal axis of the rotary cutting tool when the attachment is coupled to the rotary cutting tool; and a base coupled to the body for adjusting the depth of cut of the rotary cutting tool that is selectively adjustable between an extended position and a retracted position relative to the body;

wherein the base is coupled to a shaft having a generally trapezoidal cross-sectional shape, the shaft configured for sliding movement within a portion of the body.

2. The attachment of claim 1, wherein the body comprises a member for coupling the attachment to the rotary cutting tool, wherein the handle is integrally formed with the body.

3. The attachment of claim 2, wherein the member is a rotatable member configured for insertion into an aperture provided in the rotary cutting tool.

4. The attachment of claim 2, wherein the member is a collar configured for closing around a portion of the rotary cutting tool.

5. The attachment of claim 1, further comprising an edge guide configured for selective coupling to the base.

6. The attachment of claim 1, further comprising a guide configured for selective coupling to the base, the guide including an aperture configured for receiving a tool bit therethrough.

7. The attachment of claim 6, wherein the aperture is defined by an extension extending from a surface of the base, the extension configured to abut a portion of a template.

8. The attachment of claim 1, further comprising a dust collection device configured for selective coupling to the base.

9. The attachment of claim 1, wherein the handle may be selectively positioned between a first position in which the handle is substantially perpendicular to the central longitudinal axis of the rotary cutting tool and a second position in which the handle is substantially parallel to the central longitudinal axis of the rotary cutting tool.

10. The attachment of claim 1, further comprising a compartment provided within the attachment, whereby the compartment provides a location for storage of at least one of tools and tool bits for use with the rotary cutting tool.

11. A rotary cutting tool system comprising:

a rotary cutting tool having a housing and a central longitudinal axis; and a first attachment adapted to be selectively coupled to the housing, the first attachment including a handle portion having a gripping surface provided substantially perpendicular to the central longitudinal axis of the rotary cutting tool when the first attachment is coupled to the housing of the rotary cutting tool;

wherein the rotary cutting tool may be operated in a first mode of operation such that the first attachment is coupled to the housing and a second mode of operation without an attachment coupled thereto wherein the first attachment is removed from the rotary cutting tool;

wherein the first attachment includes a body and a base that may be selectively positioned between an extended position and a retracted position relative to the body, the base being coupled to the body by a shaft having a generally trapezoidal cross-section.

12. The rotary cutting tool system of claim 11, further comprising a second attachment adapted to be selectively coupled to the housing and including a handle portion having a gripping surface provided substantially parallel to the central longitudinal axis when the second attachment is coupled to the housing of the rotary cutting tool wherein the rotary cutting tool may be operated in a third mode of operation such that the second attachment is coupled to the housing.

13. The system of claim 11, wherein the body of the first attachment further comprises at least two members for selectively coupling the first attachment to the rotary cutting tool.

14. The system of claim 13, wherein the two members comprise a rotatable member configured for insertion into an aperture provided in the housing of the rotary cutting tool and a collar for closing around a portion of the housing of the rotary cutting tool.

15. The system of claim 11, wherein the shaft has a cross-sectional shape that is configured to resist twisting of the body when the attachment is coupled to the rotary cutting tool.

16. The system of claim 11, wherein the first attachment includes at least one compartment for storing tools.

17. The system of claim 11, wherein the first attachment includes at least one compartment for storing tool bits.

18. A rotary cutting tool adapted for operation in one of at least two different modes of operation, the rotary cutting tool comprising a tool housing adapted to support a tool bit having a longitudinal axis and a first attachment adapted to be selectively coupled to the housing, the first attachment including a handle portion having a gripping surface provided substantially perpendicular to the longitudinal axis of a tool bit when the first attachment is coupled to the housing of the rotary cutting tool, a first of said at least two different modes of operation resulting when the first attachment is coupled to the housing so that a user may grasp the handle portion of the first attachment and a second of said at least two different modes of operation resulting when the first attachment is removed from the housing so that a user may grasp the tool housing without an attachment coupled thereto; wherein the first attachment includes a body and a base that may be selectively positioned between an extended position and a retracted position relative to the body, the base coupled to the body by a shaft having a generally trapezoidal cross-section.

19. A rotary cutting tool according to claim 18 wherein the body of the first attachment further comprises at least two members for selectively coupling the first attachment to the rotary cutting tool.

20. The rotary cutting tool according to claim 19, wherein the two members comprise a rotatable member configured for insertion into an aperture provided in the housing of the rotary cutting tool and a collar for closing around a portion of the housing of the rotary cutting tool.

21. The rotary cutting tool according to claim 18, wherein the base may be selectively positioned in one of a multiple of positions between an extended position and a retracted position relative to the body.

22. The rotary cutting tool according to claim 18, wherein the shaft has a cross-sectional shape that is configured to resist twisting of the body when the attachment is coupled to the rotary cutting tool.

23. The rotary cutting tool according to claim 18, wherein the first attachment includes at least one compartment for storing tools.

24. The rotary cutting tool according to claim 18, wherein the first attachment includes at least one compartment for storing tool bits.

25. A rotary cutting tool according to claim 18 further comprising a second attachment adapted to be selectively coupled to the housing, the second attachment including a handle portion having a gripping surface provided substantially parallel to the longitudinal axis of a tool bit when the second attachment is coupled to the housing of the rotary cutting tool, a third of said at least two different modes of operation resulting when the second attachment is coupled to the housing so that a user may grasp the handle portion of the second attachment.

* * * * *